(12) United States Patent
Sutardja

(10) Patent No.: US 7,911,901 B2
(45) Date of Patent: Mar. 22, 2011

(54) MAGNETIC AND OPTICAL ROTATING STORAGE SYSTEMS WITH AUDIO MONITORING

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 918 days.

(21) Appl. No.: 11/591,326

(22) Filed: Nov. 1, 2006

(65) Prior Publication Data

US 2008/0019245 A1    Jan. 24, 2008

Related U.S. Application Data

(60) Provisional application No. 60/828,532, filed on Oct. 6, 2006, provisional application No. 60/820,189, filed on Jul. 24, 2006.

(51) Int. Cl.
*G11B 17/00* (2006.01)
(52) U.S. Cl. .................. 369/47.38; 360/73.03
(58) Field of Classification Search ............... 369/47.38; 360/73.03
See application file for complete search history.

(56) References Cited

U.S. PATENT DOCUMENTS

| 5,210,704 | A | 5/1993 | Husseiny |
|---|---|---|---|
| 5,727,928 | A | 3/1998 | Brown |
| 5,748,748 | A * | 5/1998 | Fischer et al. ............ 381/71.4 |
| 5,757,937 | A | 5/1998 | Itoh et al. |
| 5,848,282 | A | 12/1998 | Kang |
| 5,926,386 | A | 7/1999 | Ott et al. |
| 5,929,581 | A | 7/1999 | Van Brocklin et al. |
| 6,266,203 | B1 | 7/2001 | Street et al. |
| 6,301,105 | B2 | 10/2001 | Glorioso et al. |
| 6,324,487 | B1 | 11/2001 | Qian et al. |
| 6,360,185 | B1 | 3/2002 | Futawatari |
| 6,472,848 | B2 | 10/2002 | Stryker et al. |
| 6,487,463 | B1 | 11/2002 | Stepp |
| 6,591,198 | B1 | 7/2003 | Pratt |

(Continued)

FOREIGN PATENT DOCUMENTS

JP          2000275096         10/2000

(Continued)

OTHER PUBLICATIONS

The International Search Report and the Written Opinion of the International Searching Authority, or the Declaration dated Jul. 25, 2008 for International Application No. PCT/US2007/015796 filed Jul. 11, 2007; 24 pages.

*Primary Examiner* — Wayne R Young
*Assistant Examiner* — Brenda Bernardi

(57) ABSTRACT

A control system for a rotating data storage device includes a drive module configured to at least one of (i) process data, (ii) store data, and (iii) control operation of the rotating storage device; and an audio monitoring module configured to (i) communicate with the drive module and (ii) analyze audio signals that are based on noise generated by the rotating storage device during operation, The rotating storage device includes a first component The audio monitoring module is configured to selectively adjust a rotational speed of the first component by (i) a predetermined value or (ii) a predetermined percentage of the rotation speed in response to detecting resonance of the first component. The drive module is integrated with the audio monitoring module in an integrated circuit (IC). The IC is arranged on a drive printed circuit board (PCB) of the rotating storage device.

43 Claims, 16 Drawing Sheets

U.S. PATENT DOCUMENTS

| | | |
|---|---|---|
| 6,735,499 B2 | 5/2004 | Ohki et al. |
| 6,781,258 B2 | 8/2004 | Hashimoto |
| 6,809,895 B1 | 10/2004 | Choi |
| 6,836,849 B2 | 12/2004 | Brock et al. |
| 6,935,130 B2 | 8/2005 | Cheng et al. |
| 6,965,175 B2 | 11/2005 | Hu et al. |
| 6,999,894 B2 | 2/2006 | Lin et al. |
| 7,304,470 B2 | 12/2007 | Chen et al. |
| 7,424,396 B2 | 9/2008 | Dodeja et al. |
| 2002/0101714 A1 | 8/2002 | Osecky et al. |
| 2002/0101715 A1 | 8/2002 | Osecky et al. |
| 2003/0142601 A1* | 7/2003 | Fioravanti ............... 369/47.44 |
| 2004/0120113 A1* | 6/2004 | Rapaich .................. 361/687 |
| 2004/0141620 A1 | 7/2004 | Mahoney et al. |
| 2004/0205403 A1 | 10/2004 | Markow et al. |
| 2005/0211426 A1 | 9/2005 | Ziarnik et al. |
| 2005/0243661 A1* | 11/2005 | Tormasi ................. 369/13.28 |
| 2006/0197824 A1* | 9/2006 | Honda et al. ............. 347/225 |
| 2007/0035874 A1* | 2/2007 | Wendel et al. ........... 360/97.02 |
| 2007/0086598 A1 | 4/2007 | De Callafon |
| 2007/0089011 A1 | 4/2007 | Dodeja et al. |

FOREIGN PATENT DOCUMENTS

| | | |
|---|---|---|
| JP | 2000322814 | 11/2000 |
| JP | 2004252531 A | 1/2004 |
| JP | 2004152336 | 5/2004 |
| JP | 2007228477 | 9/2007 |

* cited by examiner

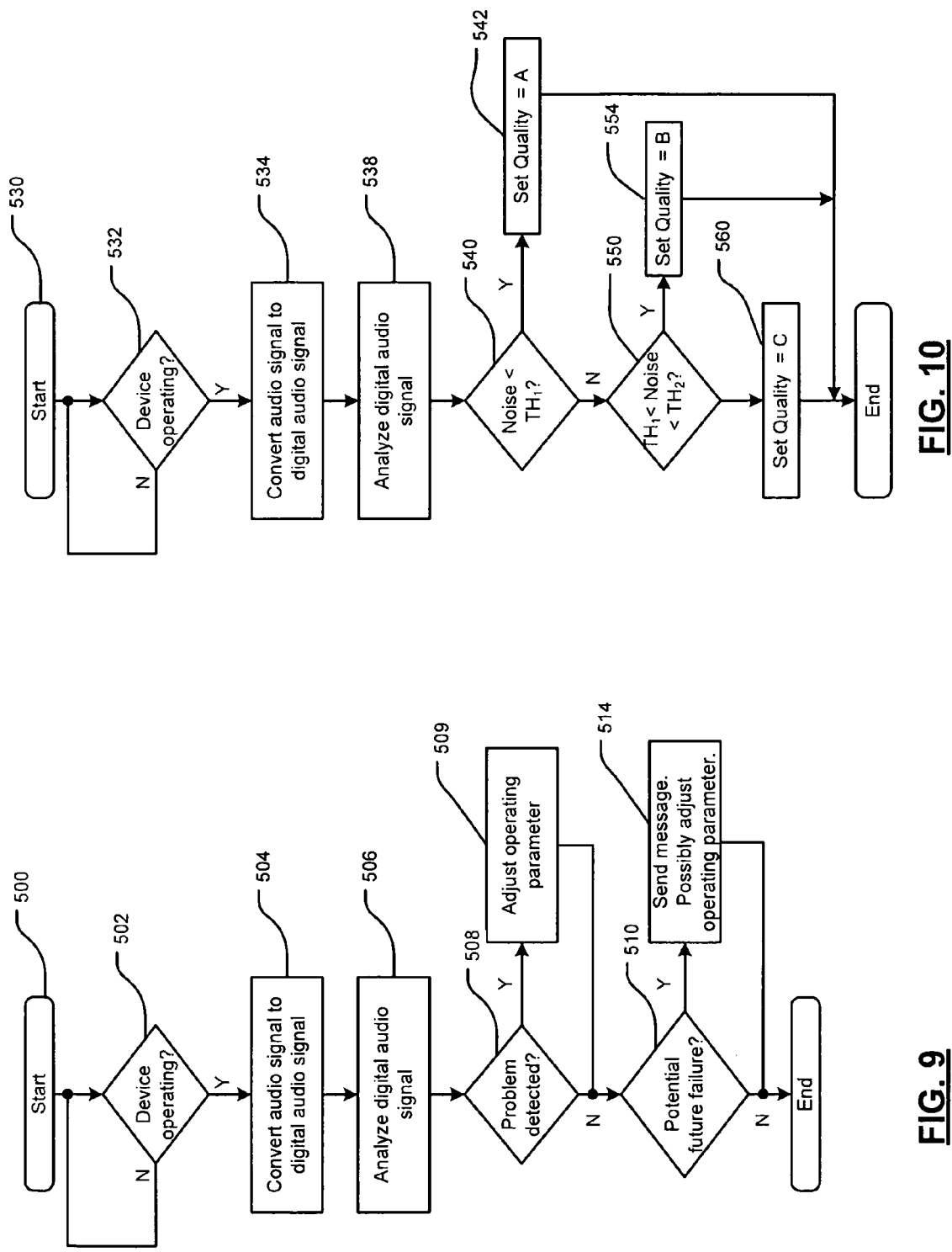

MAGNETIC AND OPTICAL ROTATING STORAGE SYSTEMS WITH AUDIO MONITORING

CROSS-REFERENCE TO RELATED APPLICATIONS

This application claims the benefit of U.S. Provisional Application Nos. 60/828,532, filed on Oct. 6, 2006 and 60/820,189, filed on Jul. 24, 2006. The disclosures of the above applications are incorporated herein by reference in their entirety.

FIELD

The present disclosure relates to hard disk drive (HDD) and digital versatile disc (DVD) systems, and more particularly to audio monitoring of HDD and DVD systems.

BACKGROUND

The Background description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Referring now to FIG. 1, a HDD system 10 is shown to include a HDD printed circuit board (PCB) 14. A buffer 18 stores read, write and/or volatile control data that is associated the control of the HDD system 10. The buffer 18 usually employs volatile memory having low latency. For example, synchronous dynamic random access memory (SDRAM) or other types of low latency memory may be used. Nonvolatile memory 19 such as flash memory may also be provided to store critical data such as nonvolatile control code.

A processor 22 arranged on the HDD PCB 14 performs data and/or control processing that is related to the operation of the HDD system 10. A hard disk control module (HDC) 26 communicates with an input/output interface 24 and with a spindle/voice coil motor (VCM) driver or module 30 and/or a read/write channel module 34. The HDC 26 coordinates control of the spindle/VCM driver 30, the read/write channel module 34 and the processor 22 and data input/output with a host 35 via the interface 24.

During write operations, the read/write channel module 34 encodes the data to be written onto a read/write device 59. The read/write channel module 34 processes the write signal for reliability and may apply, for example, error correction coding (ECC), run length limited coding (RLL), and the like. During read operations, the read/write channel module 34 converts an analog read signal output of the read/write device 59 to a digital read signal. The converted signal is then detected and decoded by known techniques to recover the data that was written on the HDD.

A hard disk drive assembly (HDDA) 50 includes one or more hard drive platters 52 that include magnetic coatings that store magnetic fields. The platters 52 are rotated by a spindle motor that is schematically shown at 54. Generally the spindle motor 54 rotates the hard drive platter 52 at a controlled speed during the read/write operations. One or more read/write arms 58 move relative to the platters 52 to read and/or write data to/from the hard drive platters 52. The spindle/VCM driver 30 controls the spindle motor 54, which rotates the platter 52. The spindle/VCM driver 30 also generates control signals that position the read/write arm 58, for example using a voice coil actuator, a stepper motor or any other suitable actuator.

The read/write device 59 is located near a distal end of the read/write arm 58. The read/write device 59 includes a write element such as an inductor that generates a magnetic field. The read/write device 59 also includes a read element (such as a magneto-resistive (MR) element) that senses the magnetic field on the platter 52. The HDDA 50 includes a preamp circuit 60 that amplifies the analog read/write signals. When reading data, the preamp circuit 60 amplifies low level signals from the read element and outputs the amplified signal to the read/write channel module 34. While writing data, a write current is generated that flows through the write element of the read/write device 59. The write current is switched to produce a magnetic field having a positive or negative polarity. The positive or negative polarity is stored by the hard drive platter 52 and is used to represent data.

Referring now to FIG. 2, a digital versatile disc (DVD) system 110 is shown to include a DVD PCB 114, which includes a buffer 118 that stores read data, write data and/or volatile control code that is associated the control of the DVD system 110. The buffer 118 may employ volatile memory such as SDRAM or other types of low latency memory. Nonvolatile memory 119 such as flash memory can also be used for critical data such as data relating to DVD write formats and/or other nonvolatile control code.

A processor 122 arranged on the DVD PCB 114 performs data and/or control processing that is related to the operation of the DVD system 110. The processor 122 also performs decoding of copy protection and/or compression/decompression as needed. A DVD control module 126 communicates with an input/output interface 124 and with a spindle/feed motor (FM) driver 130 and/or a read/write channel module 134. The DVD control module 126 coordinates control of the spindle/FM driver 130, the read/write channel module 134 and the processor 122 and data input/output via the interface 124.

During write operations, the read/write channel module 134 encodes the data to be written by an optical read/write (ORW) or optical read only (OR) device 159 to the DVD platter. The read/write channel module 134 processes the signals for reliability and may apply, for example, ECC, RLL, and the like. During read operations, the read/write channel module 134 converts an analog output of the ORW or OR device 159 to a digital signal. The converted signal is then detected and decoded by known techniques to recover the data that was written on the DVD.

A DVD assembly (DVDA) 150 includes a DVD platter 152 that stores data optically. The platter 152 is rotated by a spindle motor that is schematically shown at 154. The spindle motor 154 rotates the DVD platter 152 at a controlled and/or variable speed during the read/write operations. The ORW or OR device 159 moves relative to the DVD platter 152 to read and/or write data to/from the DVD platter 152. The ORW or OR device 159 typically includes a laser and an optical sensor.

For DVD read/write and DVD read only systems, the laser is directed at tracks on the DVD that contain lands and pits during read operations. The optical sensor senses reflections caused by the lands/pits. For DVD read/write (RW) applications, a laser may also be used to heat a die layer on the DVD platter during write operations. If the die is heated to one temperature, the die is transparent and represents one binary digital value. If the die is heated to another temperature, the die is opaque and represents the other binary digital value.

The spindle/FM driver 130 controls the spindle motor 154, which controllably rotates the DVD platter 152. The spindle/

FM driver 130 also generates control signals that position the feed motor 158, for example using a voice coil actuator, a stepper motor or any other suitable actuator. The feed motor 158 typically moves the ORW or OR device 159 radially relative to the DVD platter 152. A laser driver 161 generates a laser drive signal based on an output of the read/write channel module 134. The DVDA 150 includes a preamp circuit 160 that amplifies analog read signals. When reading data, the preamp circuit 160 amplifies low level signals from the ORW or OR device and outputs the amplified signal to the read/write channel module 134.

The DVD system 110 further includes a codec module 140 that encodes and/or decodes video such as any of the MPEG formats. Audio and/or video digital signal processors and/or modules 142 and 144, respectively, perform audio and/or video signal processing, respectively.

SUMMARY

A control system for a rotating data storage device, comprises a drive printed circuit board (PCB). A drive module is arranged on the drive PCB and at least one of processes data, stores data and controls operation of the rotating storage device. An audio monitoring module communicates with the drive module and analyzes audio signals that are based on noise generated by the rotating storage device during operation.

In other features, the drive module comprises one of a magnetic storage control module and an optical storage control module. The drive module comprises a read/write channel module. The drive module comprises a processor. The drive module comprises one of a spindle/voice coil motor drive module and a spindle/feed motor module. A data storage device comprises the control system and further comprises the rotating storage device. A microphone generates the audio signals. The rotating storage device includes a first component. The audio monitoring module selectively adjusts an operating parameter of the first component based on the audio signals. The first component one of rotates a rotating storage medium and reads data from the rotating storage medium. The rotating storage device includes one of a magnetic storage device and an optical storage device. The audio monitoring module selectively diagnoses failures of the first component based on the audio signals.

In other features, the audio monitoring module selectively estimates an age of the first component based on the audio signals. The audio monitoring module selectively predicts future component failure of the first component based on the audio signals. The audio monitoring module selectively estimates product quality of the data storage device based on the audio signals. The audio monitoring module selectively correlates the audio signals with a stored failure profile to predict failure of the first component. An analog to digital converter converts the audio signals to digital audio signals. The rotating data storage device comprises a hard disk drive that includes a hard disk drive assembly (HDDA); and a hard disk drive printed circuit board (HD PCB), wherein the microphone is arranged on one of the HDDA and the HD PCB. The hard disk drive includes a hard disk drive module; a processor; a spindle/voice coil motor (VCM) driver module; and a read/write channel module.

In other features, the audio monitoring module is integrated with at least one of the hard disk drive module, the processor, the spindle/VCM driver module, and the read/write channel module in a system on chip. The rotating data storage device comprises a digital versatile disc (DVD) that includes a digital versatile disk assembly (DVDA); and a digital versatile disk printed circuit board (DVD PCB), wherein the microphone is arranged on one of the DVDA and the DVD PCB. The digital versatile disk includes a digital versatile disk control module; a processor; a spindle/feed motor (FM) driver module; and a read/write channel module. The audio monitoring module is integrated with at least one of the digital versatile disk control module, the processor, the spindle/FM driver module, and the read/write channel module in a system on chip. The audio monitoring module performs sub-band analysis on the audio signals. The first component includes at least one of a spindle motor and a voice coil motor (VCM). The first component includes at least one of a spindle motor and a feed motor.

In other features, a flex connector connects components of the HDDA and the HD PCB, wherein the microphone is arranged on the HDDA. A conductor that communicates with the audio monitoring module and the microphone is associated with the flex connector. A flex connector connects components of the DVDA and the DVD PCB. The microphone is arranged on the DVDA and wherein a conductor that communicates with the audio monitoring module and the microphone is associated with the flex connector. The hard disk drive includes a power management interface module and wherein the audio monitoring module is integrated with the power management interface module in a system on chip. The digital versatile disc includes a power management interface module and wherein the audio monitoring module is integrated with the power management interface module in a system on chip. The drive module is integrated with the audio monitoring module in an integrated circuit.

A method for operating a rotating data storage device, comprises providing a drive printed circuit board (PCB); arranging a drive module on the drive PCB; at least one of processing data, storing data and controlling operation of the rotating storage device using the drive module; and analyzing audio signals that are based on noise generated by the rotating storage device during operation.

In other features, the drive module comprises one of a magnetic storage control module, an optical storage control module, a read/write channel module, a processor, a spindle/ voice coil motor drive module and a spindle/feed motor module. The method further includes adjusting operation of a first component of the rotating storage device based on an input operating parameter; and selectively adjusting the input operating parameter of the first component based on the audio signals. The rotating storage device includes one of a magnetic storage device and an optical storage device. The method further includes electively diagnosing failures of the first component based on the audio signals.

In other features, the method includes selectively estimating an age of the first component based on the audio signals. The method further includes selectively predicting future component failure of the first component based on the audio signals. The method further includes selectively estimating product quality of the data storage device based on the audio signals. The method further includes selectively correlating the audio signals with a stored failure profile to predict failure of the first component. The method further includes performing sub-band analysis on the audio signals. The first component includes at least one of a spindle motor and a voice coil motor (VCM). The first component includes at least one of a spindle motor and a feed motor.

A control system for a rotating data storage device, comprises a drive printed circuit board (PCB); drive control means, that is arranged on the drive PCB, for at least one of processing data, storing data and controlling operation of the rotating storage device; and audio monitoring means, that communicates with the drive control means, for analyzing audio signals that are based on noise generated by the rotating storage device during operation.

In other features, the drive control means comprises one of magnetic storage control means for controlling a magnetic storage device and optical storage control means for controlling an optical storage device. The drive control means comprises a read/write channel means for processing read/write data. The drive control means comprises processing means for processing data. The drive control means comprises one of spindle/voice coil motor drive means for driving a spindle/voice coil motor and spindle/feed motor drive means for driving a spindle/feed motor. A data storage device comprising the control system and further comprising the rotating storage device. Audio means generates the audio signals. The rotating storage device includes a first component, wherein the audio monitoring means selectively adjusts an operating parameter of the first component based on the audio signals. The first component one of rotates the rotating storage medium and reads data from the rotating storage medium. The rotating storage device includes one of a magnetic storage device and an optical storage device. The audio monitoring means selectively diagnoses failures of the first component based on the audio signals. The audio monitoring means selectively estimates an age of the first component based on the audio signals. The audio monitoring means selectively predicts future component failure of the first component based on the audio signals. The audio monitoring means selectively estimates product quality of the data storage device based on the audio signals. The audio monitoring means selectively correlates the audio signals with a stored failure profile to predict failure of the first component. Analog to digital converting means converts the audio signals to digital audio signals.

In other features, the rotating data storage device comprises a hard disk drive that includes a hard disk drive assembly (HDDA); and a hard disk drive printed circuit board (HD PCB), wherein the audio means is arranged on one of the HDDA and the HD PCB. The hard disk drive includes hard disk drive control means for controlling; processor means for processing; spindle/voice coil motor (VCM) driver means for driving; and read/write channel means for processing read/write data.

In other features, the audio monitoring means is integrated with at least one of the hard disk drive control means, the processing means, the spindle/VCM driver means, and the read/write channel means in a system on chip. The rotating data storage device comprises a digital versatile disc (DVD) that includes a digital versatile disk assembly (DVDA); and a digital versatile disk printed circuit board (DVD PCB), wherein the audio means is arranged on one of the DVDA and the DVD PCB. The digital versatile disk includes digital versatile disk control means for controlling; processing means for processing; spindle/feed motor (FM) driver means for driving; and read/write channel means for processing read/write data.

In other features, the audio monitoring means is integrated with at least one of the digital versatile disk control means, the processing means, the spindle/FM driver means, and the read/write channel means in a system on chip. The audio monitoring means performs sub-band analysis on the audio signals. The first component includes at least one of a spindle motor and a voice coil motor (VCM). The first component includes at least one of a spindle motor and a feed motor. Flexible connecting means connects components of the HDDA and the HD PCB, wherein the audio means is arranged on the HDDA and wherein conducting means for communicating with the audio monitoring means and the audio means is associated with the flexible connecting means. Flexible connecting means connects components of the DVDA and the DVD PCB, wherein the audio means is arranged on the DVDA and wherein conducting means for communicating with the audio monitoring means and the audio means is associated with the flexible connecting means. The hard disk drive includes power management interface means for providing a power interface and wherein the audio monitoring means is integrated with the power management interface means in a system on chip. The digital versatile disc includes power management interface means for providing a power interface and wherein the audio monitoring means is integrated with the power management interface means in a system on chip. The drive control means is integrated with the audio monitoring means in an integrated circuit.

An integrated circuit for controlling a rotating data storage device comprises a drive module that is implemented by the integrated circuit and that at least one of processes data, stores data and controls operation of the rotating storage device; and an audio monitoring module that is implemented by the integrated circuit, that communicates with the drive module and that analyzes audio signals that are based on noise generated by the rotating storage device during operation.

The drive module comprises one of a magnetic storage control module and an optical storage control module. The drive module comprises a read/write channel module. The drive module comprises a processor. The drive module comprises one of a spindle/voice coil motor drive module and a spindle/feed motor module. A data storage device comprises the integrated circuit and further comprises the rotating storage device. A microphone generates the audio signals. The rotating storage device includes a first component, wherein the audio monitoring module selectively adjusts an operating parameter of the first component based on the audio signals. The first component one of rotates the rotating storage medium and reads data from the rotating storage medium. The rotating storage device includes one of a magnetic storage device and an optical storage device. The audio monitoring module selectively diagnoses failures of the first component based on the audio signals. The audio monitoring module selectively estimates an age of the first component based on the audio signals. The audio monitoring module selectively predicts future component failure of the first component based on the audio signals. The audio monitoring module selectively estimates product quality of the data storage device based on the audio signals. The audio monitoring module selectively correlates the audio signals with a stored failure profile to predict failure of the first component. An analog to digital converter converts the audio signals to digital audio signals. The rotating data storage device comprises a hard disk drive that includes: a hard disk drive assembly (HDDA); and a hard disk drive printed circuit board (HD PCB), wherein the microphone is arranged on one of the HDDA and the HD PCB. The hard disk drive includes a hard disk drive control module; a processor; a spindle/voice coil motor (VCM) driver module; and a read/write channel module.

In other features, the audio monitoring module is integrated with at least one of the hard disk drive control module, the processor, the spindle/VCM driver module, and the read/write channel module in a system on chip. The rotating data storage device comprises a digital versatile disc (DVD) that includes a digital versatile disk assembly (DVDA); and a digital versatile disk printed circuit board (DVD PCB), wherein the microphone is arranged on one of the DVDA and the DVD PCB. The digital versatile disk includes a digital versatile disk control module; a processor; a spindle/feed motor (FM) driver module; and a read/write channel module. The audio monitoring module is integrated with at least one of the digital versatile disk control module, the processor, the spindle/FM driver module, and the read/write channel module in a system on chip. The audio monitoring module performs sub-band analysis on the audio signals. The first component includes at least one of a spindle motor and a voice coil motor (VCM). The first component includes at least one of a spindle motor and a feed motor. A flex connector connects components of the HDDA and the HD PCB, wherein the microphone is arranged on the HDDA and wherein a conductor that communicates with the audio monitoring module and the microphone is associated with the flex connector. A flex connector that connects components of the DVDA and the DVD PCB, wherein the microphone is arranged on the DVDA and wherein a conductor that communicates with the audio monitoring module and the microphone is associated with the flex connector.

In other features, the hard disk drive includes a power management interface module and wherein the audio monitoring module is integrated with the power management interface module in a system on chip. The digital versatile disc includes a power management interface module and wherein the audio monitoring module is integrated with the power management interface module in a system on chip. The drive module is integrated with the audio monitoring module in an integrated circuit.

A method for controlling a rotating data storage device comprises implementing a drive module of the rotating storage device using an integrated circuit; at least one of processing data, storing data and controlling operation of the rotating storage device using the drive module; and using an audio monitoring module that is implemented by the integrated circuit and that communicates with the drive module to analyze audio signals that are based on noise generated by the rotating storage device during operation.

In other features, the drive module comprises one of a magnetic storage control module and an optical storage control module. The drive module comprises a read/write channel module. The drive module comprises a processor. The drive module comprises one of a spindle/voice coil motor drive module and a spindle/feed motor drive module. The method include using a microphone to generate the audio signals. The rotating storage device includes a first component and further comprising selective adjusting an operating parameter of the first component based on the audio signals. The first component one of rotates a rotating storage medium and reads data from the rotating storage medium. The rotating storage device includes one of a magnetic storage device and an optical storage device.

In other features, the method includes selectively diagnosing failures of the first component based on the audio signals. The method includes selectively estimating an age of the first component based on the audio signals. The method includes selectively predicting future component failure of the first component based on the audio signals. The method includes selectively estimating product quality of the rotating storage device based on the audio signals. The method includes selectively correlating the audio signals with a stored failure profile to predict failure of the first component. The method includes performing sub-band analysis on the audio signals.

An integrated circuit for controlling a rotating data storage device comprises drive means, that is implemented by the integrated circuit, for at least one of processing data, storing data and controlling operation of the rotating storage device; and audio monitoring means, that is implemented by the integrated circuit, for communicating with the drive means and for analyzing audio signals that are based on noise generated by the rotating storage device during operation.

In other features, the drive control means comprises one of magnetic storage control means for controlling a magnetic storage device and optical storage control means for controlling an optical storage device. The drive means comprises a read/write channel means for processing read/write data. The drive control means comprises processing means for processing data. The drive control means comprises one of spindle/voice coil motor drive means for driving a spindle/voice coil motor and spindle/feed motor drive means for driving a spindle/feed motor. A data storage device comprises the integrated circuit and further comprises the rotating storage device. Audio means generates the audio signals. The rotating storage device includes a first component, wherein the audio monitoring means selectively adjusts an operating parameter of the first component based on the audio signals. The first component one of rotates the rotating storage medium and reads data from the rotating storage medium. The rotating storage device includes one of a magnetic storage device and an optical storage device. The audio monitoring means selectively diagnoses failures of the first component based on the audio signals. The audio monitoring means selectively estimates an age of the first component based on the audio signals. The audio monitoring means selectively predicts future component failure of the first component based on the audio signals. The audio monitoring means selectively estimates product quality of the data storage device based on the audio signals. The audio monitoring means selectively correlates the audio signals with a stored failure profile to predict failure of the first component.

In other features, an analog to digital converter converts the audio signals to digital audio signals. The rotating data storage device comprises a hard disk drive that includes a hard disk drive assembly (HDDA); and a hard disk drive printed circuit board (HD PCB), wherein the microphone is arranged on one of the HDDA and the HD PCB. The hard disk drive includes hard disk drive control means for controlling; processor means for processing; spindle/voice coil motor (VCM) driver means for driving; and read/write channel means for processing read/write data.

In other features, the audio monitoring means is integrated with at least one of the hard disk drive control means, the processing means, the spindle/VCM driver means, and the read/write channel means in a system on chip. The rotating data storage device comprises a digital versatile disc (DVD) that includes a digital versatile disk assembly (DVDA); and a digital versatile disk printed circuit board (DVD PCB), wherein the microphone is arranged on one of the DVDA and the DVD PCB. The digital versatile disk includes digital versatile disk control means for controlling; processing means for processing; spindle/feed motor (FM) driver means for driving; and read/write channel means for processing read/write data.

In other features, the audio monitoring means is integrated with at least one of the digital versatile disk control means, the processing means, the spindle/FM driver means, and the read/write channel means in a system on chip. The audio monitoring means performs sub-band analysis on the audio signals. The first component includes at least one of a spindle motor and a voice coil motor (VCM). The first component includes at least one of a spindle motor and a feed motor. Flexible connecting means connects components of the HDDA and the HD PCB, wherein the audio means is arranged on the HDDA and wherein conducting means for communicating with the audio monitoring means and the audio means is associated with the flexible connecting means. Flexible connecting means connects components of the DVDA and the DVD PCB, wherein the audio means is arranged on the DVDA and wherein conducting means for communicating with the audio monitoring means and the audio means is associated with the flexible connecting means. The hard disk drive includes power management interface means for providing a power interface and wherein the audio monitoring means is integrated with the power management interface means in a system on chip. The digital versatile disc includes power management interface means for providing a power interface and wherein the audio monitoring means is integrated with the power management interface means in a system on chip. The drive control means is integrated with the audio monitoring means in an integrated circuit.

A computer system comprises a processor that performs data processing; a fan that cools the processor; and an audio monitoring module that analyzes audio signals that are based on noise generated by the fan during operation.

In other features, the audio monitoring module is integrated with the processor in an integrated circuit. A microphone communicates with the audio monitoring module and that generates the audio signals. A heat sink thermal communicates with the processor and the fan. The audio monitoring module selectively adjusts an operating parameter of the fan based on the audio signals. The audio monitoring module selectively diagnoses failures of the fan based on the audio signals. The audio monitoring module selectively estimates an age of the fan based on the audio signals. The audio monitoring module selectively predicts future failure of the fan based on the audio signals. The audio monitoring module selectively estimates product quality of the fan based on the audio signals. The audio monitoring module selectively correlates the audio signals with a stored failure profile to predict failure of the fan. A motherboard arranged on the chassis, wherein the fan is arranged on the chassis. The processor includes a graphics processor. The microphone is arranged on at least one of the motherboard and the chassis.

A computer system comprises processing means for performing data processing; fan means for cooling the processing means; and audio monitoring means for analyzing audio signals that are based on noise generated by the fan means during operation.

In other features, the audio monitoring means is integrated with the processing means in an integrated circuit. Audio input means communicates with the audio monitoring means and generates the audio signals. Heat sink means thermally communicating heat from the processing means to the fan means. The audio monitoring means selectively adjusts an operating parameter of the fan means based on the audio signals. The audio monitoring means selectively diagnoses failures of the fan means based on the audio signals. The audio monitoring means selectively estimates an age of the fan means based on the audio signals. The audio monitoring means selectively predicts future failure of the fan means based on the audio signals. The audio monitoring means selectively estimates product quality of the fan means based on the audio signals. The audio monitoring means selectively correlates the audio signals with a stored failure profile to predict failure of the fan means. A motherboard is arranged on the chassis. The fan means is arranged on the chassis. The processing means includes graphics processing means for processing graphics. The audio input means is arranged on at least one of the motherboard and the chassis.

A method for operating a computer system comprises providing a processor for the computer system that performs data processing; cooling the processor using a fan; and analyzing audio signals that are based on noise generated by the fan during operation.

In other features, the method includes integrating the audio monitoring module with the processor in an integrated circuit. The method includes using a microphone that communicates with the audio monitoring module to generate the audio signals. The method includes providing a heat sink to transfer heat from the processor to the fan. The method includes selectively adjusting an operating parameter of the fan based on the audio signals. The method includes selectively diagnosing failures of the fan based on the audio signals. The method includes selectively estimating an age of the fan based on the audio signals. The method includes selectively predicting future component failure of the fan based on the audio signals. The method includes selectively estimating product quality of the fan based on the audio signals. The method includes selectively correlating the audio signals with a stored failure profile to predict failure of the fan.

In other features, the method includes providing a chassis and a motherboard arranged on the chassis; and arranging the fan on the chassis. The processor includes a graphics processor. The method includes providing a chassis and a motherboard arranged on the chassis; and arranging the microphone on at least one of the motherboard and the chassis.

In still other features, the systems and methods described above are implemented by a computer program executed by one or more processors. The computer program can reside on a computer readable medium such as but not limited to memory, non-volatile data storage and/or other suitable tangible storage mediums.

A device comprises an integrated circuit. A fan cools the integrated circuit. An audio monitoring module analyzes audio signals that are based on noise generated by the fan during operation.

In other features, the audio monitoring module is implemented by and integrated with the integrated circuit. A microphone communicates with the audio monitoring module and that generates the audio signals. A heat sink thermally communicates with the integrated circuit and the fan. The audio monitoring module selectively adjusts an operating parameter of the fan based on the audio signals. The audio monitoring module selectively diagnoses failures of the fan based on the audio signals. The audio monitoring module selectively estimates an age of the fan based on the audio signals. The audio monitoring module selectively predicts future failure of the fan based on the audio signals. The audio monitoring module selectively estimates product quality of the fan based on the audio signals. The audio monitoring module selectively correlates the audio signals with a stored failure profile to predict failure of the fan.

In other features, the device includes a chassis. At least one of a printed circuit board and a motherboard are arranged on the chassis. The fan is arranged on the chassis and the integrated circuit is arranged on the at least one of the printed circuit board and the motherboard. The integrated circuit includes one of a central processing unit, a graphics processing unit (GPU) and an application specific integrated circuit (ASIC). The device includes a chassis. At least one of a printed circuit board and a motherboard is arranged on the chassis. The microphone is arranged on at least one of the chassis and the at least one of the printed circuit board and the motherboard.

In other features, the audio monitoring module selectively generates an indication signal based on the audio signals. The rotating storage device includes a first component and the audio monitoring module selectively adjusts a rotational speed of the first component when the audio monitoring module detects resonance of the first component. The audio monitoring module adjusts the rotational speed by one of a predetermined value or a predetermined percentage of the rotation speed.

A device comprises an integrated circuit. Fan means cools the integrated circuit. Audio monitoring means analyzes audio signals that are based on noise generated by the fan means during operation.

In other features, the audio monitoring means is implemented by and integrated with the integrated circuit. Audio input means communicates with the audio monitoring means and generates the audio signals. Heat sink means thermally communicates heat from the integrated circuit to the fan means. The audio monitoring means selectively adjusts an operating parameter of the fan means based on the audio signals. The audio monitoring means selectively diagnoses failures of the fan means based on the audio signals. The audio monitoring means selectively estimates an age of the fan means based on the audio signals. The audio monitoring means selectively predicts future failure of the fan means based on the audio signals. The audio monitoring means selectively estimates product quality of the fan means based on the audio signals. The audio monitoring means selectively correlates the audio signals with a stored failure profile to predict failure of the fan means.

In other features, the device includes a chassis. At least one of a printed circuit board and a motherboard is arranged on the chassis. The fan means is arranged on the chassis and the integrated circuit is arranged on the at least one of the printed circuit board and the motherboard. The integrated circuit includes one of a central processing unit, a graphics processing unit and an application specific integrated circuit (ASIC).

In other features, the device includes a chassis and at least one of a printed circuit board and a motherboard. The audio input means is arranged on at least one of the chassis and the at least one of the printed circuit board and the motherboard.

A method for operating a device comprises providing an integrated circuit; cooling the integrated circuit using a fan; and analyzing audio signals that are based on noise generated by the fan during operation.

In other features, the method includes integrating the audio monitoring module with the integrated circuit. The method includes using a microphone that communicates with the audio monitoring module to generate the audio signals. The method includes providing a heat sink to transfer heat from the integrated circuit to the fan. The method includes selectively adjusting an operating parameter of the fan based on the audio signals. The method includes selectively diagnosing failures of the fan based on the audio signals. The method includes selectively estimating an age of the fan based on the audio signals. The method includes selectively predicting future component failure of the fan based on the audio signals. The method includes selectively estimating product quality of the fan based on the audio signals. The method includes selectively correlating the audio signals with a stored failure profile to predict failure of the fan.

In other features, the method includes providing a chassis and at least one of a printed circuit board and a motherboard arranged on the chassis and arranging the fan on the chassis. The integrated circuit includes one of a central processing unit, a graphics integrated circuit and an application specific integrated circuit (ASIC). The method includes providing a chassis and at least one of a printed circuit board and a motherboard arranged on the chassis and arranging the microphone on at least one of the chassis and the at least one of the printed circuit board and the motherboard.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 9 is a flowchart illustrating a method for adjusting an operating parameter of a HDD or DVD system based on audio monitoring;

FIG. 10 is a flowchart illustrating a method for determining product quality of a HDD or DVD system based on audio monitoring;

DETAILED DESCRIPTION

Figure 1:
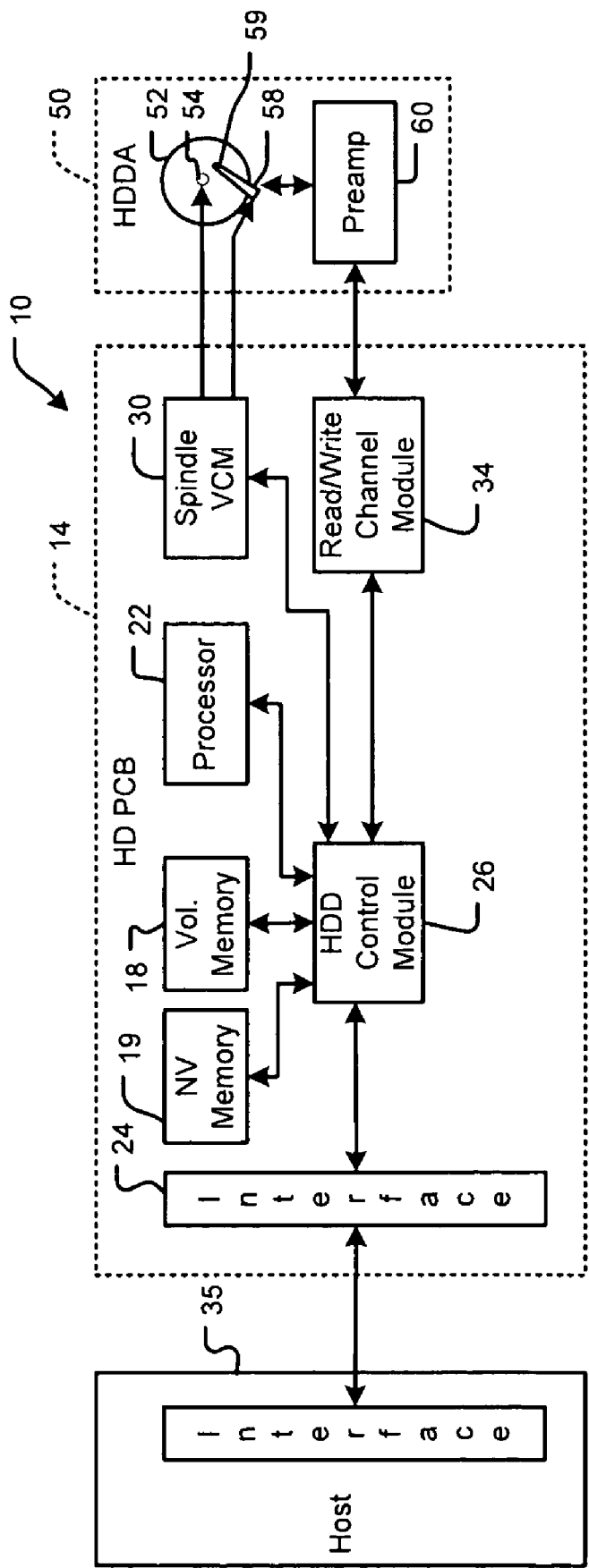
FIG. 1 is a functional block diagram of a HDD system according to the prior art.
Figure 2:
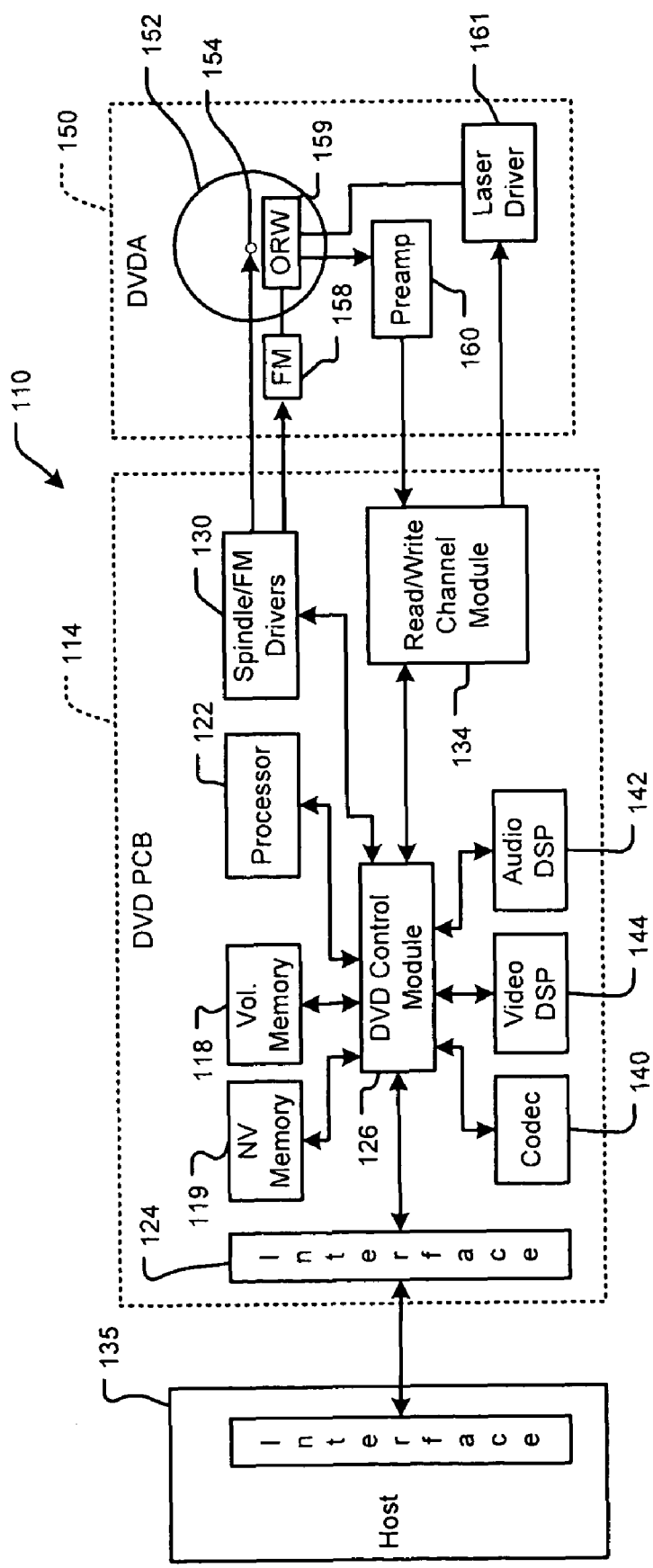
FIG. 2 is a functional block diagram of a DVD system according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

A microphone monitors noise generated by components of hard disk assemblies (HDDAs) and/or DVD assemblies (DVDAs). Due to the mechanical nature of the HDDA and/or DVDA, the noise generated by the motor, servo movement, air turbulence, intermittent head crash, loose components, and/or various mechanical resonances can be identified using an audio monitor module as will be described below. When a resonance mode of the component is detected, the audio monitoring module may increase or decrease the speed of the component by a predetermined amount or percentage. The predetermined amount may include fixed values, fixed percentages of a current speed, variable values or percentages, progressive values and/or other suitable values.

For example, the audio monitor module can use sub-band analysis. Operation of HDD and DVD systems can be improved by monitoring signal levels, frequencies and noise patterns as well as the changes of monitored parameters as a function of time. These systems may automatically adjust HDD or DVD operating parameters to lower acoustic noise. By doing so, user annoyance may be decreased. Adjusting operation of the HDDA or DVDA away from resonance modes of the mechanical components can be optimized during use for different HDD or DVD systems. In addition, real time monitoring of motor and/or servo noise may be used to predict future failure events. Analysis of historical data may be performed to estimate and monitor aging of the HDD or DVD systems.

The audio monitor module may also be used as a relatively low cost method for differentiating product quality. For example, this approach can be used to separate high quality or low quality drives from other medium-quality drives. Lower noise devices tend to be more reliable than the higher noise ones, particularly for HDD or DVD systems having the same or similar designs. In addition, real time monitoring of mechanical components can be used to improve future quality levels. While DVD systems are discussed herein, the present disclosure applied to compact discs (CDs) as well.

The microphone may be embedded on the HDDA or DVDA and/or embedded on a printed circuit board assembly (PCBA) of the HDD or DVD systems. If embedded in the HDDA or DVDA, the microphone can share a flex connector to reduce cost. In addition, an audio analog to digital converter (ADC) can be embedded on a system on chip (SOC), motor controller and/or power management module to reduce system cost. The processor of the SOC can be shared with the audio monitoring module to perform the audio signal analysis, which reduces cost.

Figure 3A:
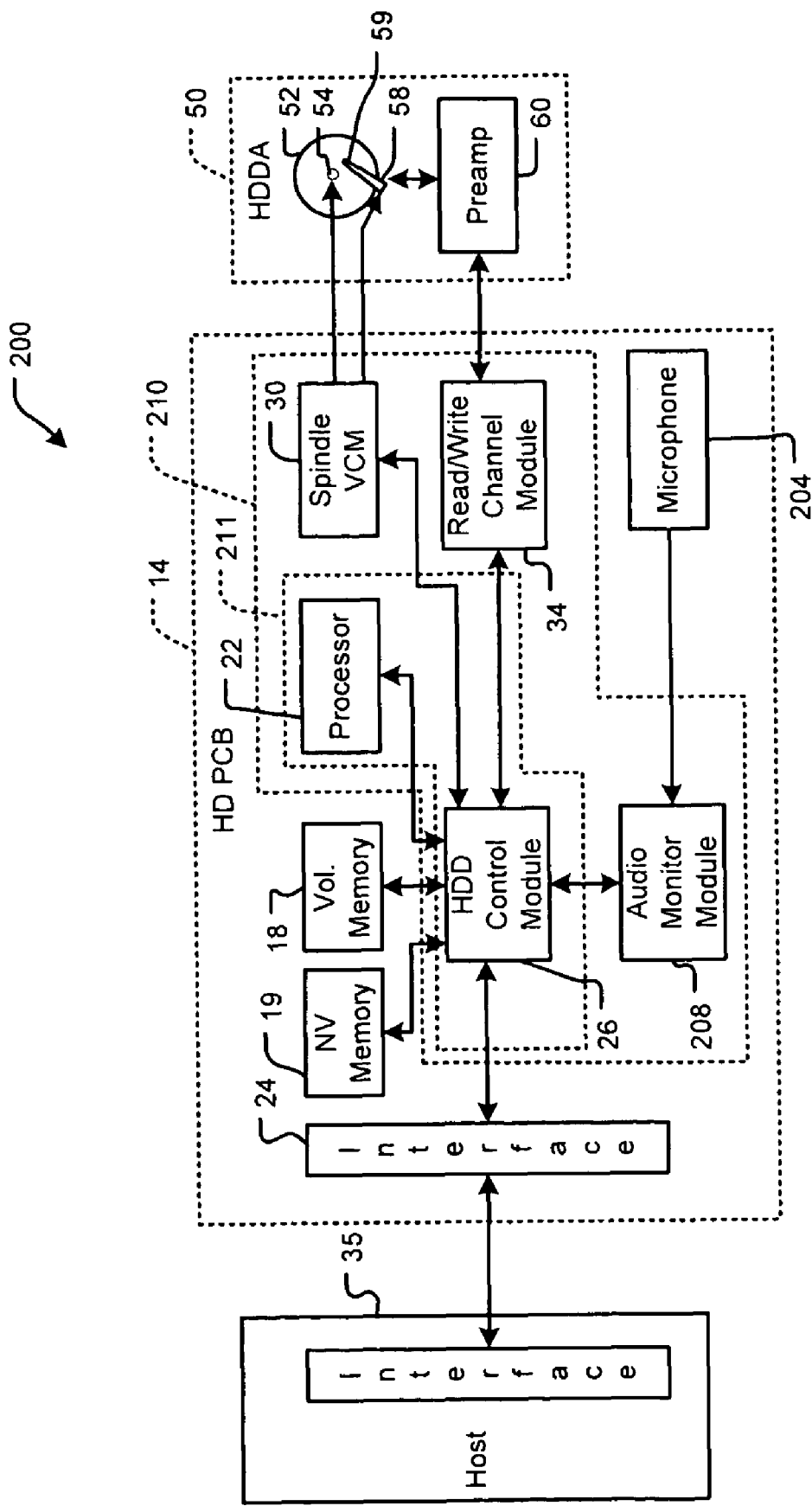
FIG. 3A is a functional block diagram of a first exemplary HDD system including an audio monitor module and microphone according to the present disclosure.
Figure 3B:
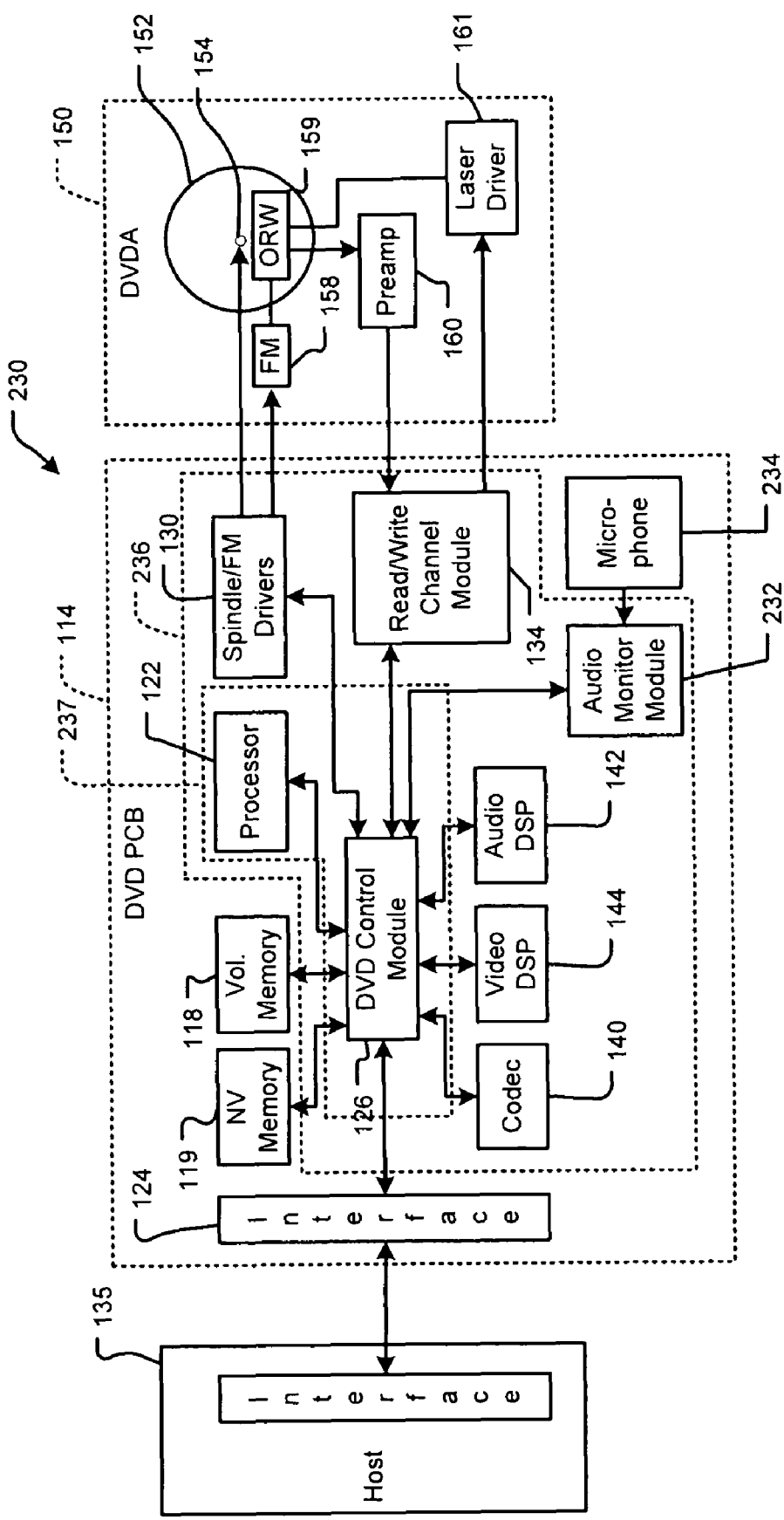
FIG. 3B is a functional block diagram of a first exemplary DVD system including an audio monitor module and microphone according to the present disclosure.

Referring now to FIGS. 3A and 3B, the audio analysis module and the microphone can be located on the PCB of the associated device. In FIG. 3A, a first exemplary HDD system 200 includes a microphone 204 and an audio monitor module 208. The microphone 204 receives audio signals during operation of the HDD system. The audio monitor module 208 converts the signals to digital signals and performs audio analysis on the signals as described above and/or below. The analysis may include monitoring various signal levels, frequencies and patterns of noise occurrences as well as the changes of monitored parameters as a function of time. The patterns may include resonances at particular frequencies or other criteria. Based on the analysis, the audio monitor module 208 selectively changes an operating parameter of the HDD system and/or performs other actions.

The microphone 204 and audio monitor module 208 may be associated with the HD PCB 14. As used herein, the term drive module may be used to refer to components of the HDD that help to control, store data, process data and/or otherwise operate the HDD such as but not limited to the HDC control module 26, the processor 22, the spindle/VCM driver module 30, the read/write channel module 34, etc. The microphone 204 and/or the audio monitor module 208 may be associated and/or integrated with one or more additional components such as the HDC control module 26, the processor 22, the spindle/VCM driver module 30, and/or the read/write channel module 34 in a system on chip (SOC) 210. Alternately, the processor 22 may be embedded in or integrated with the HDC control module 26 as indicated by dotted lines 211.

In FIG. 3B, a first exemplary DVD system 230 includes an audio monitor module 232 and a microphone 234 that are associated with the DVD PCB 114. The microphone 234 receives audio signals during operation of the DVD system. The audio monitor module 232 converts the signals to digital signals and performs analysis on the signals as described above and/or below. Based on the analysis, the audio monitor module 232 selectively changes an operating parameter of the DVD system and/or performs other actions.

The microphone 234 and audio monitor module 232 may be associated with the DVD PCB 114. As used herein, the term drive module may also be used to refer to components of the DVD that help to control, stored data, process data and/or otherwise operate the DVD such as but not limited to the control module 126, the processor 122, the spindle/FM driver module 130, the read/write channel module 134, etc. The microphone 234 and/or the audio monitor module 232 may be associated with and/or integrated with one or more additional devices such as the control module 126, the processor 122, the spindle/FM driver module 130, and/or the read/write channel module 134 in a system on chip (SOC) 236. Alternately, the processor 122 may be embedded in or integrated with the control module 126 as indicated by dotted lines 237.

Figure 4A:
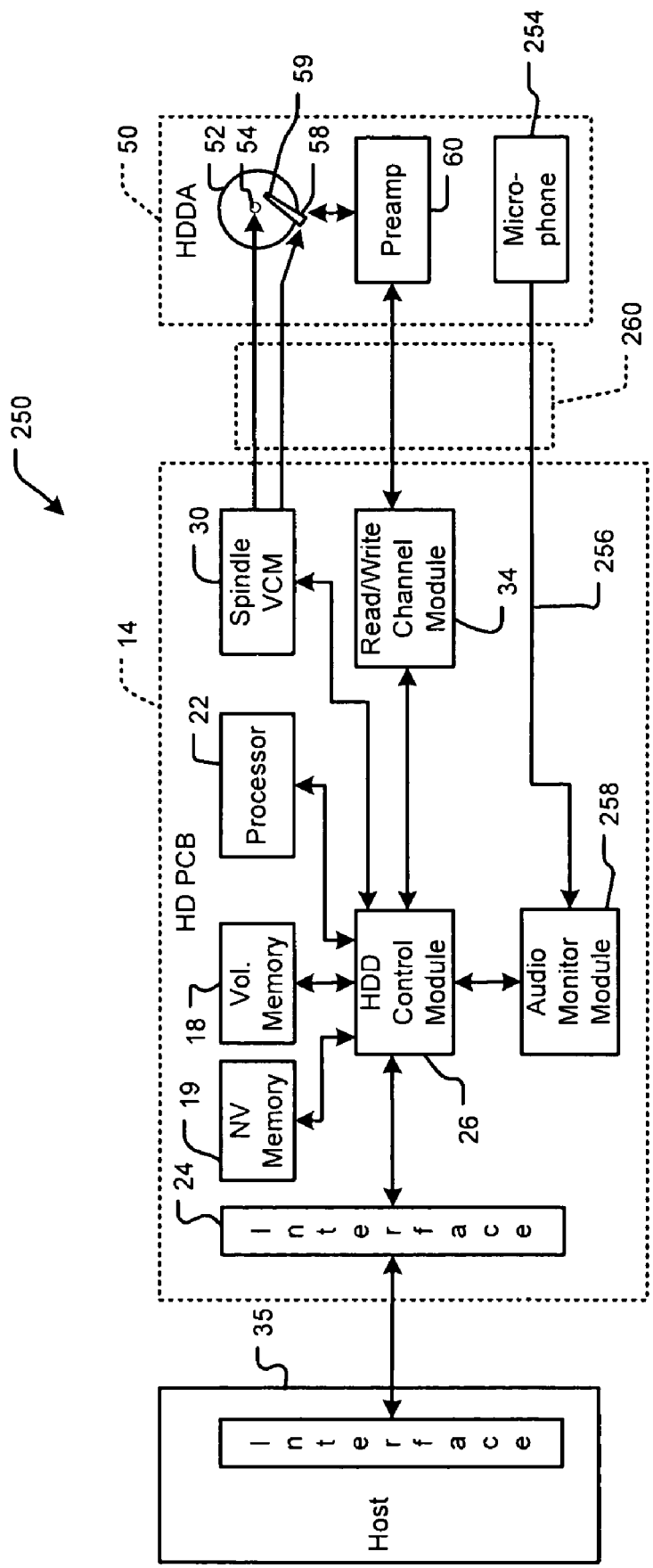
FIG. 4A is a functional block diagram of a second exemplary HDD system including an audio monitor module and microphone according to the present disclosure.
Figure 4B:
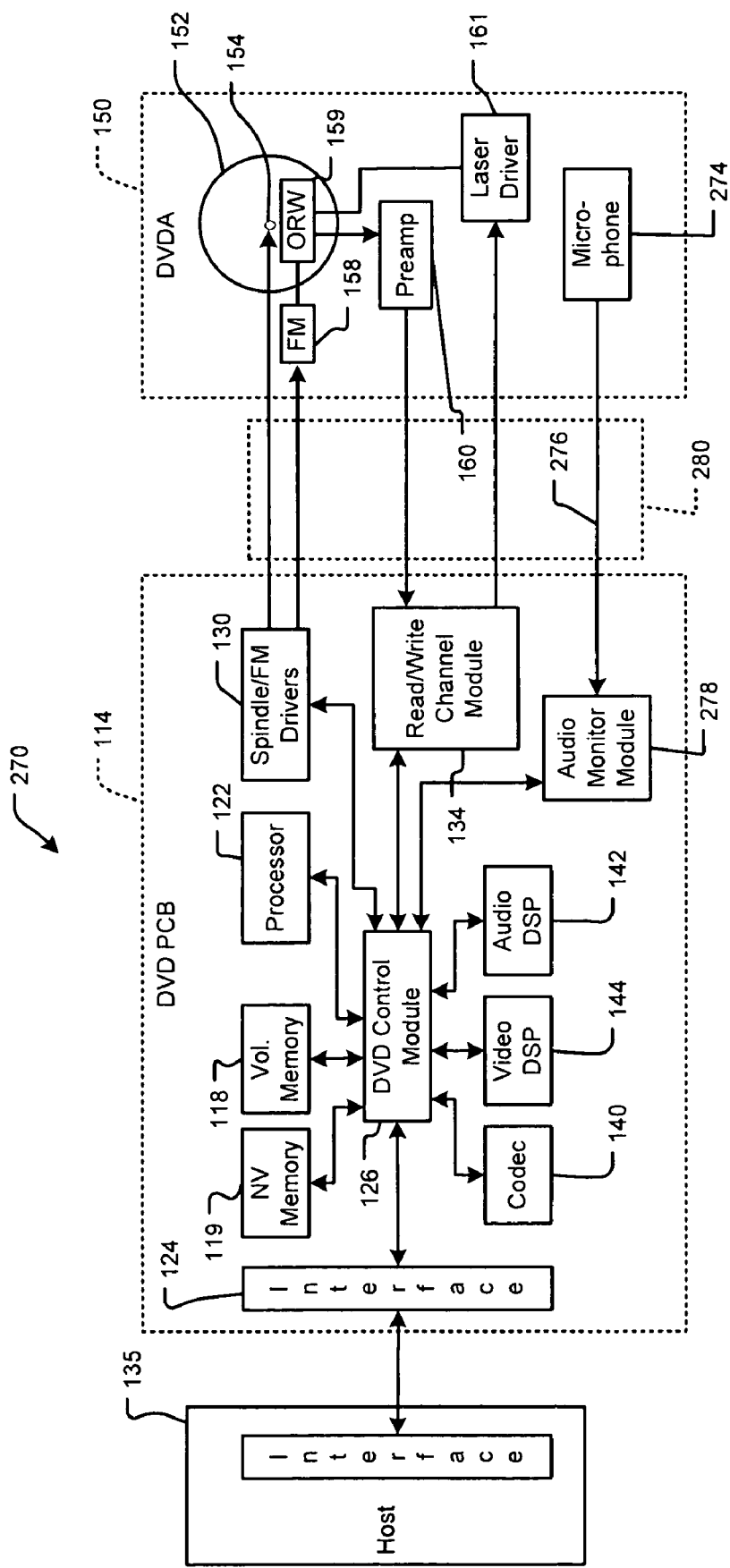
FIG. 4B is a functional block diagram of a second exemplary DVD system including an audio monitor module and microphone according to the present disclosure.

There are many different locations and/or possible implementations for the microphone and/or audio monitor module. Referring now to FIGS. 4A and 4B, second exemplary HDD and DVD systems including audio monitor modules and microphones are shown. In FIG. 4A, a HDD system 250 includes microphone 254 that is associated with the HDDA 50. A connection 256 from the microphone 254 to an audio monitor module 258 can be routed by a flex connector 260 to reduce cost. The flex connector 260 may also include conductors for other devices such as the preamplifier 60 and servo 58. In FIG. 4B, a DVD system 270 includes a microphone 274 that is associated with the DVDA 150. A connection 276 from the microphone 274 to an audio monitor module 278 can also be provided by a flex connector 280 to reduce cost.

Figure 5A:
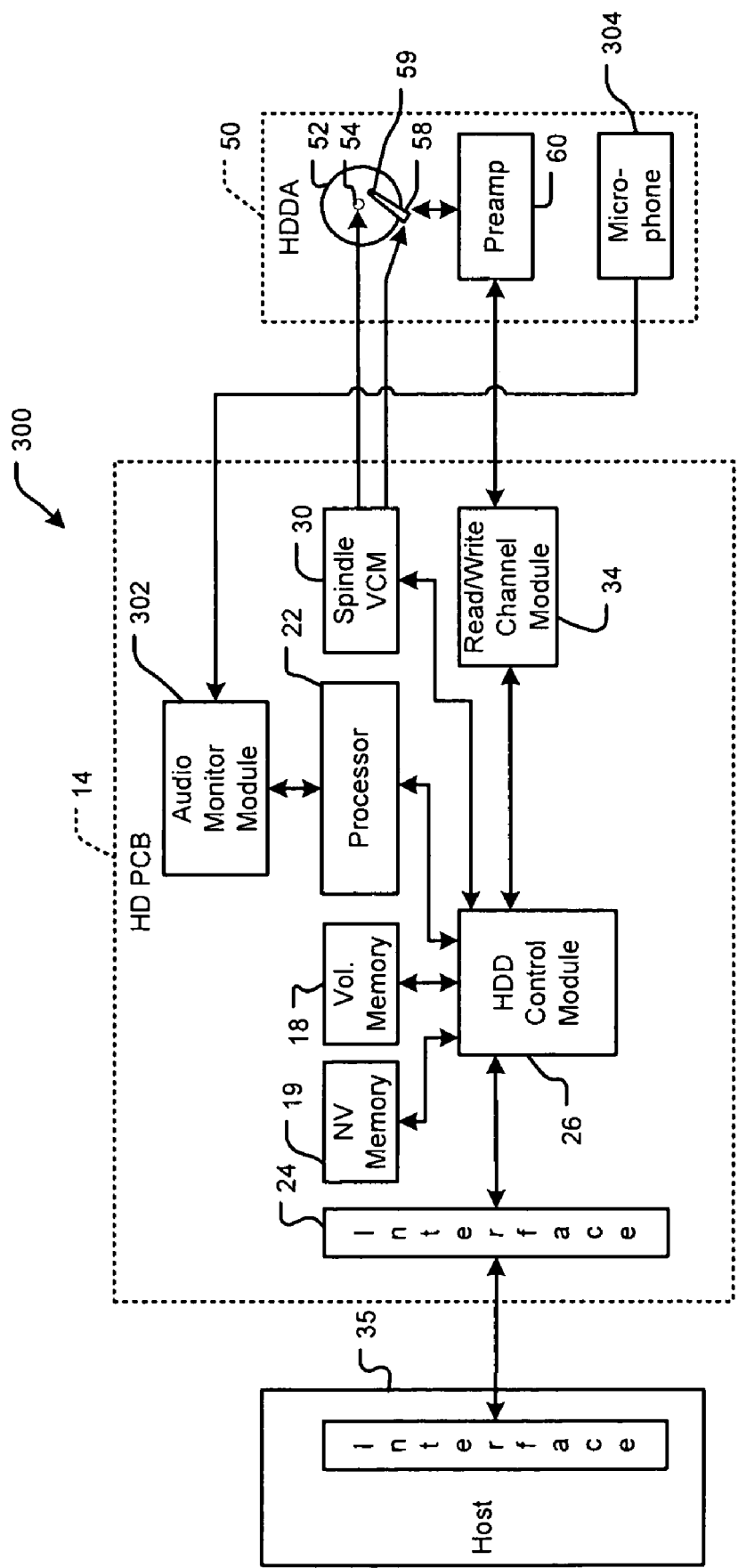
FIG. 5A is a functional block diagram of a third exemplary HDD system including an audio monitor module and microphone according to the present disclosure.
Figure 5B:
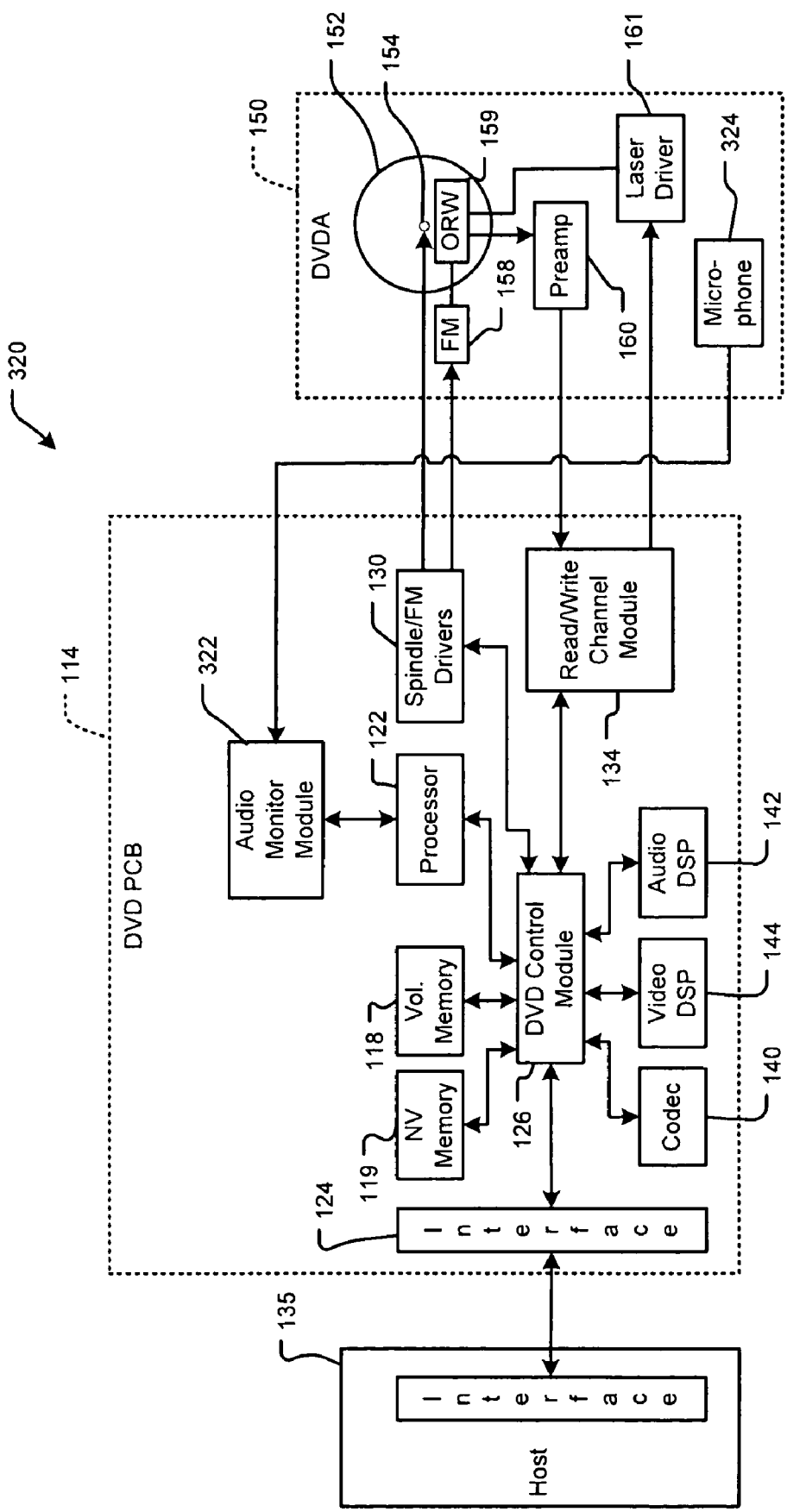
FIG. 5B is a functional block diagram of a third exemplary DVD system including an audio monitor module and microphone according to the present disclosure.

Referring now to FIGS. 5A and 5B, third exemplary HDD and DVD systems including audio monitor modules and microphones are shown. In FIG. 5A, a HDD system 300 includes an audio monitor module 302 and a microphone 304. The microphone 304 may be associated with the HDDA 50 as shown and/or with the HD PCB 14. The audio monitor module 302 may be integrated with the processor in an SOC.

Processing for the audio monitor module 302 may be performed by the processor 22, which reduces cost.

In FIG. 5B, a DVD system 320 includes an audio monitor module 322 and a microphone 324. The microphone 324 may be associated with the DVDA 150 as shown and/or with the DVD PCB 114. Processing for the audio monitor module 322 may be performed by the processor 122, which reduces cost. Both the audio monitor modules 302 and 322 the processors 22 and 122 may be integrated on a SOC, respectively. Other components may also be integrated on the SOC as described above.

Figure 6A:
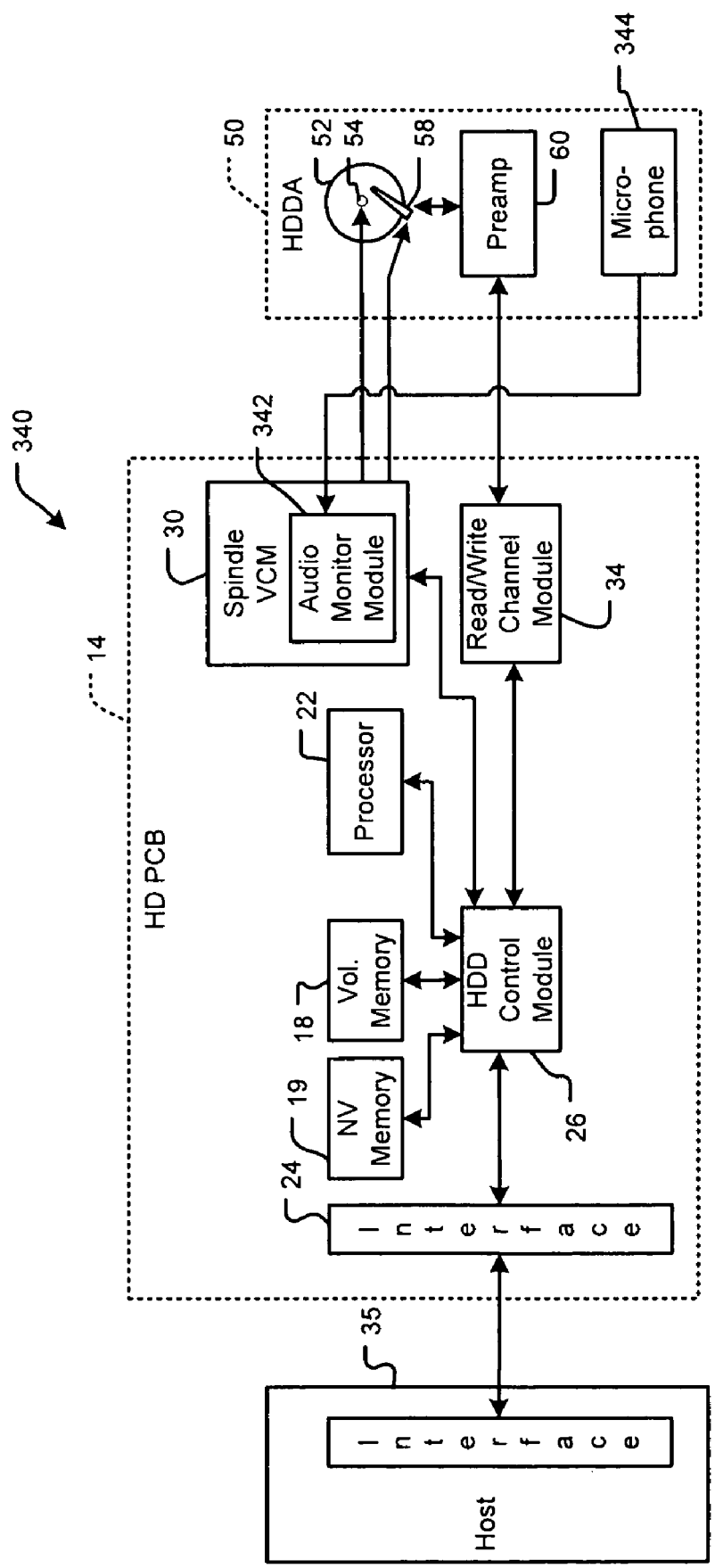
FIG. 6A is a functional block diagram of a fourth exemplary HDD system including an audio monitor module and microphone according to the present disclosure.
Figure 6B:
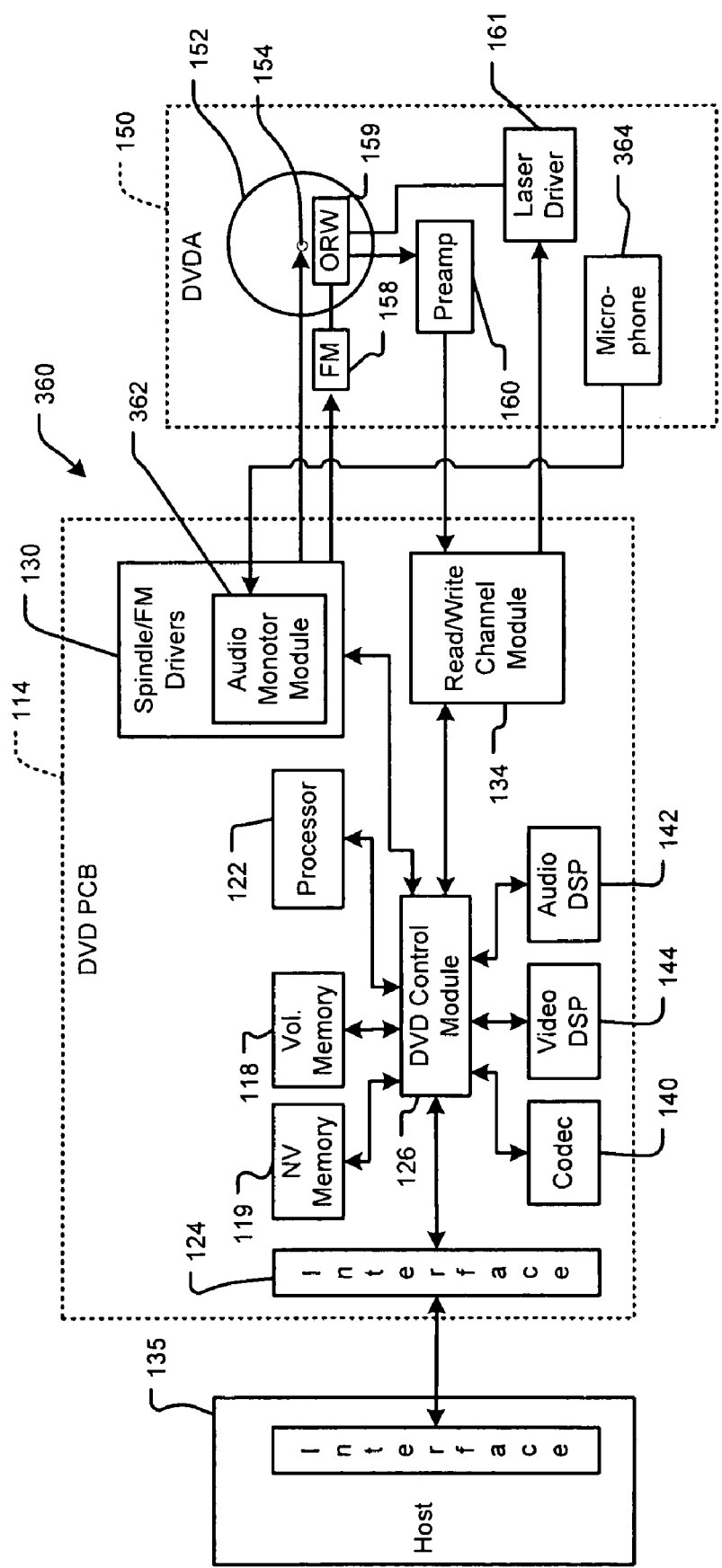
FIG. 6B is a functional block diagram of a fourth exemplary DVD system including an audio monitor module and microphone according to the present disclosure.

Referring now to FIGS. 6A and 6B, fourth exemplary HDD and DVD systems including an audio monitor module and microphone are shown. In FIG. 6A, a HDD system 340 includes an audio monitor module 342 and a microphone 344. The audio monitor module 342 is integrated with the spindle/VCM driver module 30. The microphone 344 may be located on the HDDA 50 and/or the HD PCB 14. In FIG. 6B, a DVD system 360 includes an audio monitor module 362 and a microphone 364. The audio monitor module 362 is integrated with the spindle/FM driver module 130. The microphone 364 may be located on the DVDA 150 and/or the DVD PCB 114.

As can be appreciated, the audio monitor modules may be integrated with other components of the HDD systems such as but not limited to the HDC control module 26 and/or read/write channel module 34. Likewise, the audio monitor modules may be integrated with other components of the DVD systems such as but not limited to the DSPs 140, 144 and 142, the DVD control module 126 and/or the read/write module 134. Furthermore, various components can be integrated by SOC.

Figure 7A:
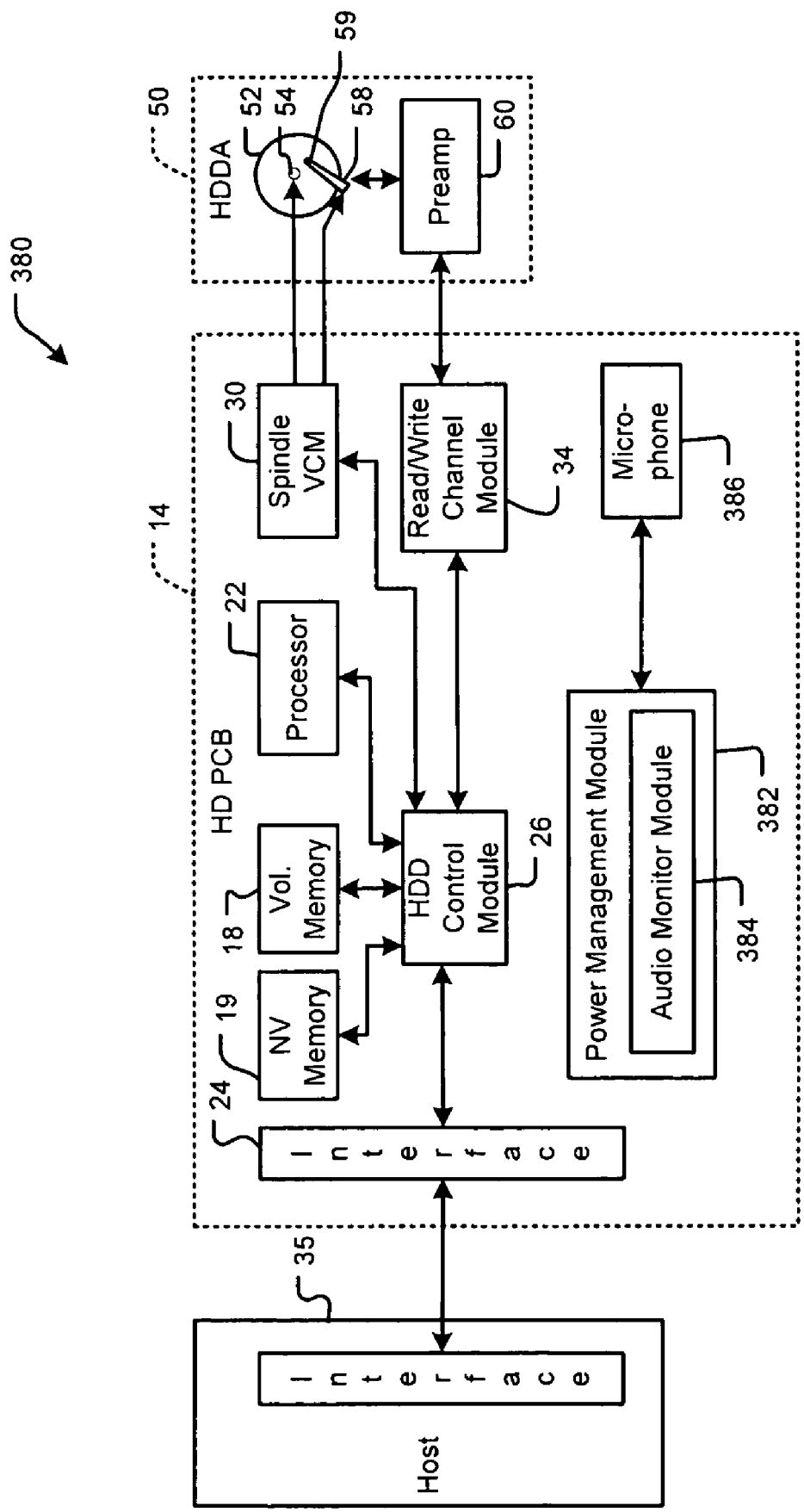
FIG. 7A is a functional block diagram of a fifth exemplary HDD system including an audio monitor module and microphone according to the present disclosure.
Figure 7B:
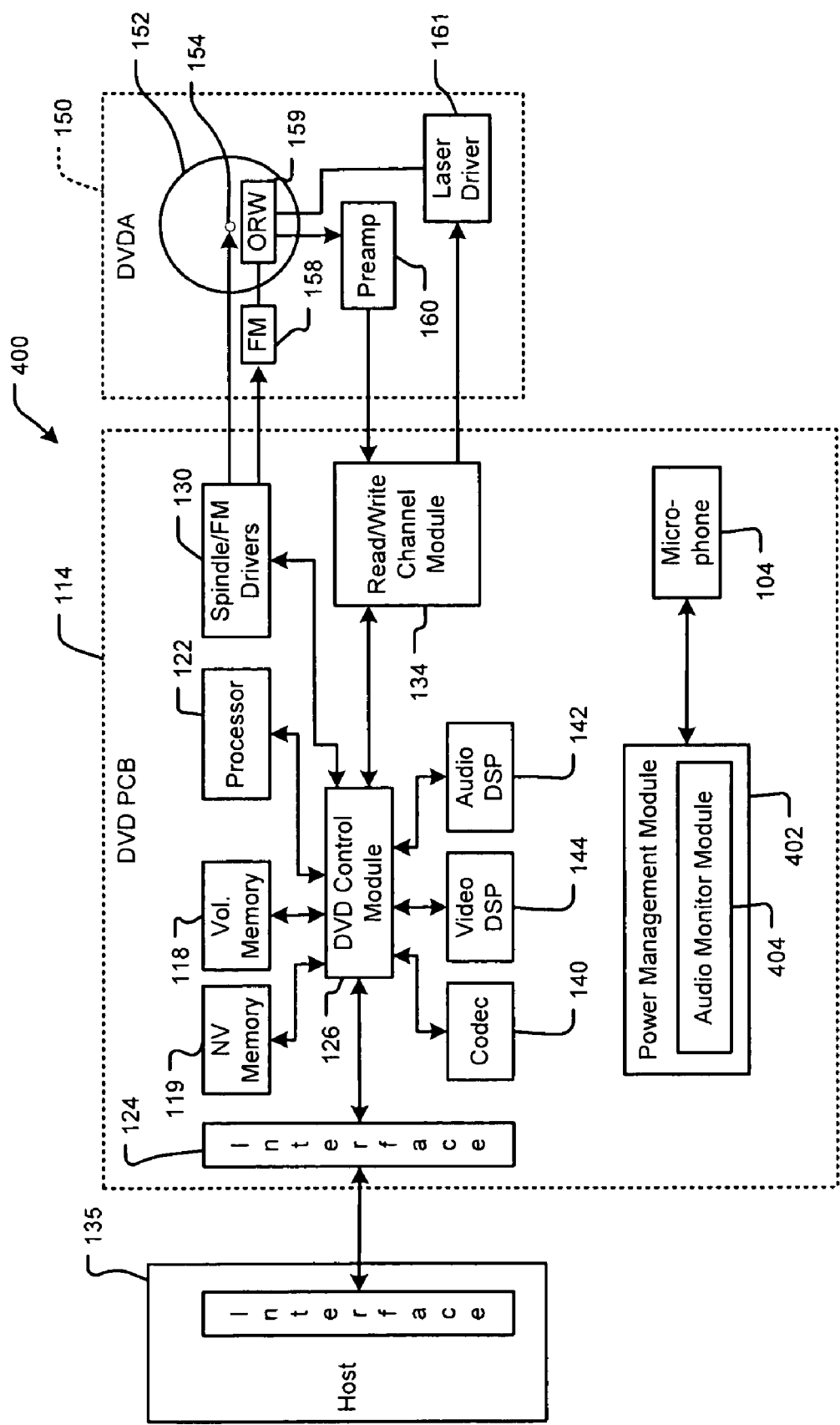
FIG. 7B is a functional block diagram of a fifth exemplary DVD system including an audio monitor module and microphone according to the present disclosure.

Referring now to FIGS. 7A and 7B, fifth exemplary HDD and DVD systems including audio monitor modules and microphones are shown. In FIG. 7A, HDD system 380 includes a power management module 382 that manages power of the HDD system 380. The HDD system 380 further includes an audio monitor module 384 and a microphone 386. The audio monitor module 384 is implemented by the power management module 382. The microphone 386 may be located on the HDDA 50 and/or the HD PCB 14.

In FIG. 7B, a DVD system 400 includes a power management module 402 that manages power of the DVD system 400. The DVD system 402 further includes an audio monitor module 404 and a microphone 406. The audio monitor module 404 is implemented by the power management module 400, which manages power for the DVD. The microphone 406 may be located on the DVDA 150 and/or the DVD PCB 114.

Figure 8:
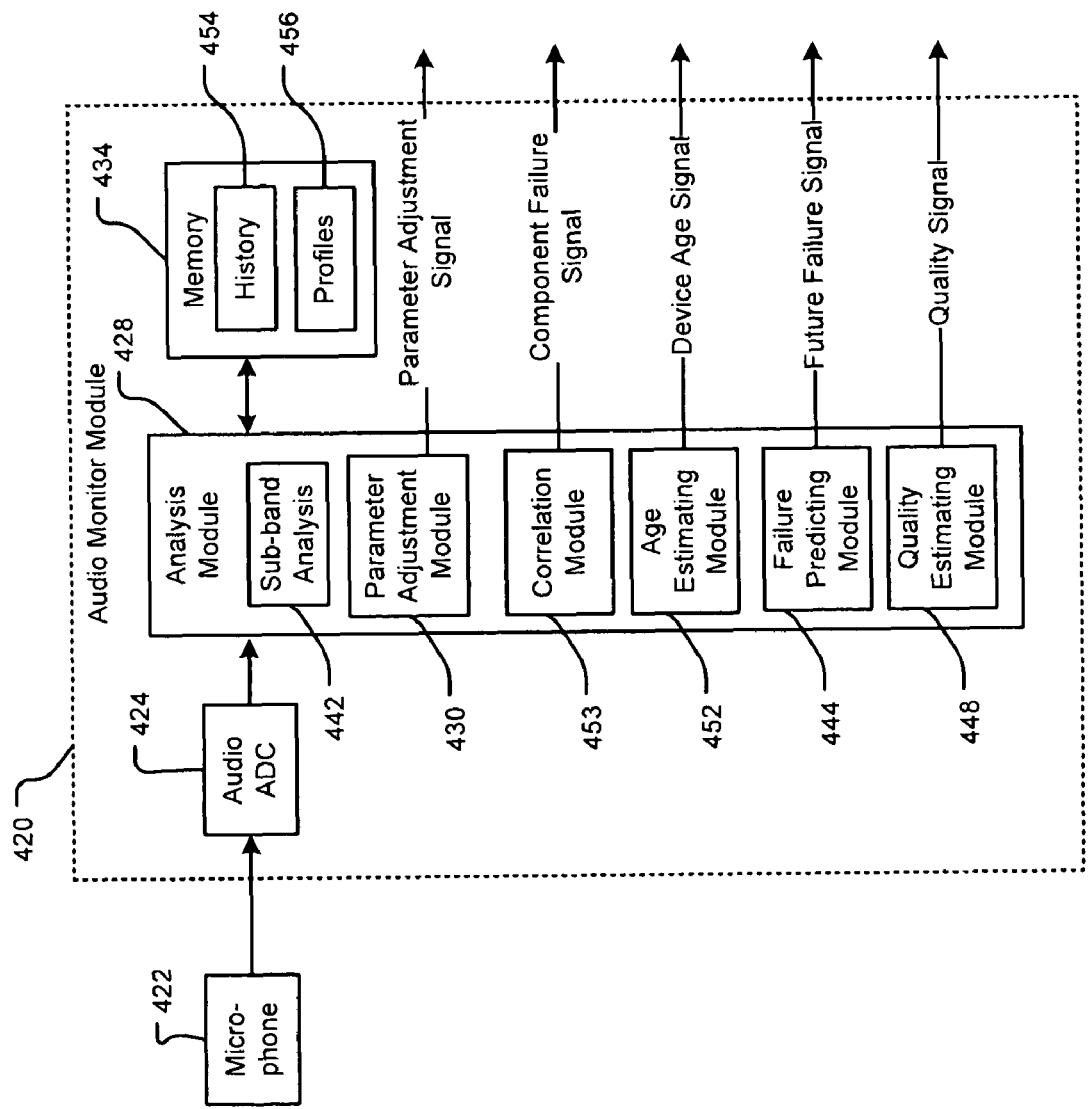
FIG. 8 is a functional block diagram of an exemplary audio monitor module according to the present disclosure.

Referring now to FIG. 8, an exemplary audio monitor module 420 according to the present disclosure is shown. The audio monitor module 420 receives an output of a microphone 422. The audio monitor module 420 includes an analog-to-digital converter (ADC) 424 that converts the analog output of the microphone to a digital audio signal. An analysis module 428 receives the digital audio output of the analog-to-digital converter 424. The analysis module 428 selectively transmits data to and receives data from memory 434. The memory may be local to the analysis module and/or shared memory such as volatile memory and NV memory. A parameter adjustment module 430 selectively adjusts operating parameters of the HDD or DVD device based on the analysis.

The analysis module 428 may include a sub-band analysis module 442 that monitors signal levels, frequencies and patterns of noise occurrences, changes of monitored parameters as a function of time, and/or other functions of the monitored parameters. The patterns may include resonances at a particular frequency or other criteria.

A failure predicting module 444 selectively predicts failures based on current and/or historical noise information and/or functions thereof. For example, the failure predicting module may extrapolate based on current and/or historical data and estimate an expected failure date. A quality analysis module 448 may estimate the quality of the HDD or DVD device based upon measured current and/or historical noise information and/or function thereof. An age estimating module 452 estimates age of the device based upon current and/or historical noise information, changes in current or historical information and/or other functions of current and/or historical noise information. The age may be relative to an expected obsolescence or service life. For example, the age estimating module 452 may monitor changes in noise levels as a function of time. The noise levels may be compared to a function, data, curve or other stored information to estimate the age of the device or component.

A correlation module 453 may be used to compare current noise information to stored noise information to identify particular failures. The memory module 434 may store noise profiles relating to possible failure modes. The correlation module 453 may correlate current and/or historical noise profiles with stored profiles. When the correlation exceeds a predetermined correlation value, the correlation module may output a fault message, initiate diagnostics and/or take other action.

Referring now to FIG. 9, a flowchart illustrates steps of an exemplary method for adjusting an operating parameter of a HDD or DVD based on sensed noise information. Control begins in step 500. In step 502, control determines whether the device is operating. In step 504, control converts audio signals to digital audio signals. In step 506, control analyzes digital audio signals. In step 508, control determines whether a problem has been detected. In other words, control determines where the noise information indicates a problem. For example, the monitored noise parameter exceeds a threshold. If true, control adjusts an operating parameter of the HDD or DVD device in step 509. For example, rotational speed, scanning speed, voltage level, current level or any other parameter may be adjusted. If step 508 is false, control continues with step 510 and determines whether there is a potential future failure based on current and/or historical noise information and/or functions thereof. If step 510 is true, control sends a message to a host device and/or adjusts an operating parameter of the HDD or DVD device in step 514.

Referring now to FIG. 10, a flowchart illustrates steps of a method for determining device quality of HDD or DVD systems based on sensed noise information. Control begins with step 530. In step 532, control determines whether the device is operating. If true, control converts audio signals to digital audio signals in step 534.

In step 538, control analyzes digital audio signals. In step 540, control compares current and/or historical noise information and/or a function thereof to a first threshold. If the noise level is less than a first threshold, control sets quality to a first quality value in step 542. If step 540 is false, control determines whether the current and/or historical noise information is greater than a first threshold but less than a second threshold in step 550. If true, control sets quality to a second quality value in step 554. Otherwise control sends quality to a third quality value in step 560. While three quality values or levels are described, additional or fewer quality values may be used. The quality values or levels may be used for variable pricing and/or other marketing decisions.

Figure 11:
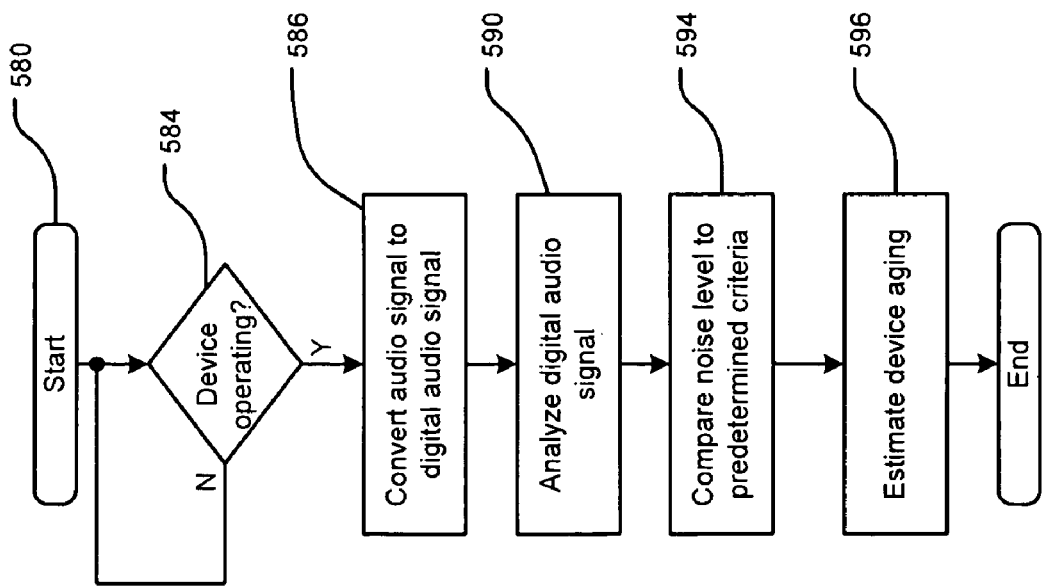
FIG. 11 is a flowchart illustrating a method for estimating aging of a HDD or DVD system based on audio monitoring.

Referring now to FIG. 11, a flowchart illustrates steps of a method for estimating aging of HDD or DVD systems based on current and/or historical noise levels. Control begins in step 580. In step 584, control determines whether the device is operating. In step 586, control converts audio signals to digital audio signals. In step 590, control analyzes the digital audio signals. In step 594, control compares current and/or historical noise levels to predetermined thresholds, functions or other predetermined criteria. In step 596, control estimates an age of the HDD or DVD system and/or one or more components thereof based upon the comparison.

Figure 12:
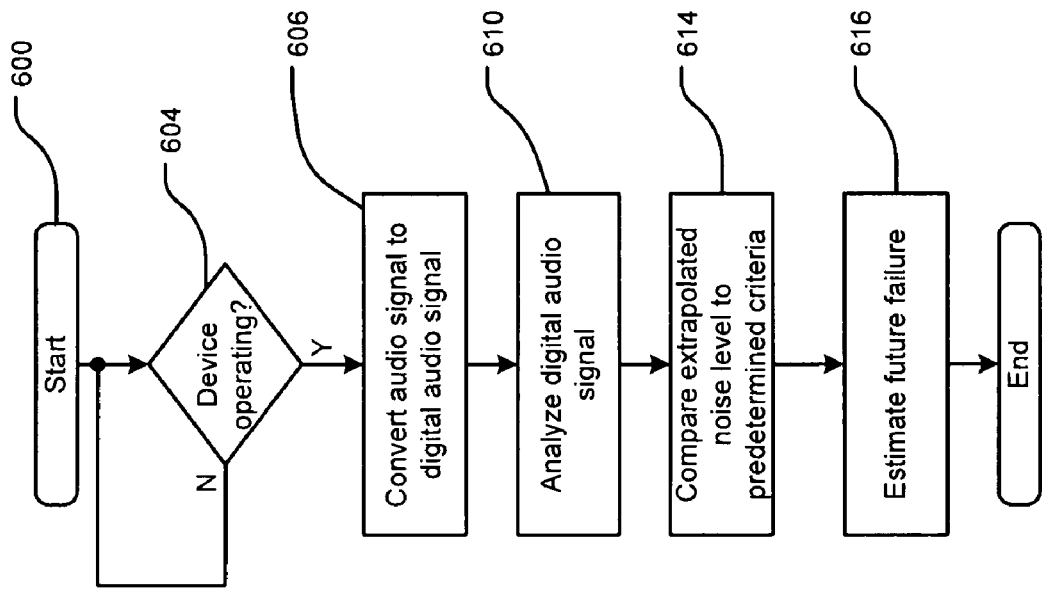
FIG. 12 is a flowchart illustrating a method for estimating future failures of a HDD or DVD system based on audio monitoring.

Referring now to FIG. 12, a flowchart illustrates steps of a method for estimating future failures of HDD or DVD systems based on current and/or historical noise levels. Control begins in step 600. In step 604, control determines whether the device is operating. In step 606, control converts audio signals to digital audio signals. In step 610, control analyzes the digital audio signals. In step 614, control extrapolates future performance based on current and/or historical noise levels and compares the extrapolations to predetermined thresholds, functions or other predetermined criteria. In step 616, control estimates future failure of the HDD or DVD system and/or one or more components thereof based upon the comparison. For example, control may provide an estimated failure date or number of estimated operating hours until failure.

Figure 13:
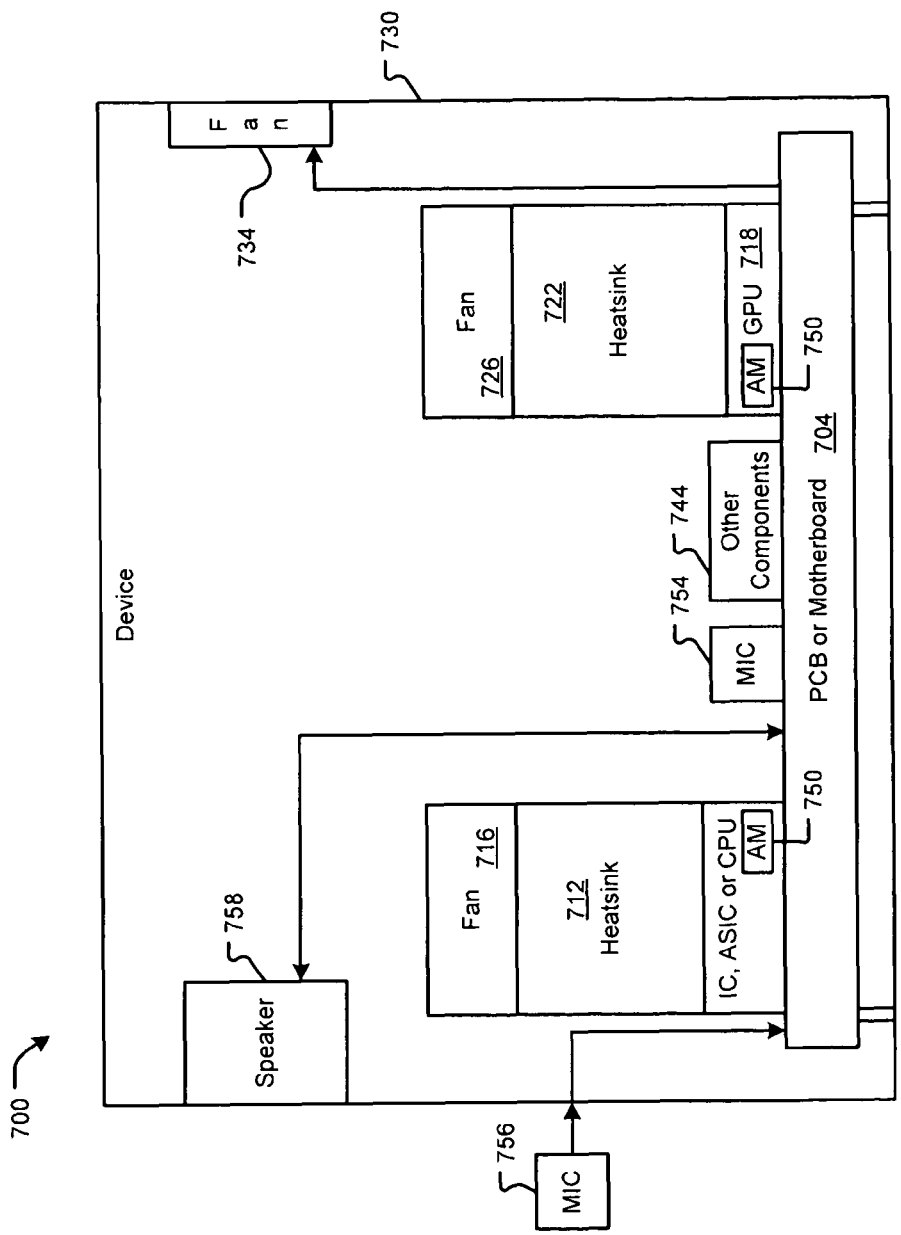
FIG. 13 is a functional block diagram of a device including an integrated circuit such as a central processing unit, a graphic processing unit or an application specific integrated circuit and a fan.

Referring now to FIG. 13, a device 700 is shown to include a printed circuit board (PCB) (not shown) or a motherboard 704. For example only, the device 700 may be a computer system, a network switch, a router, a server, or other type of electronic device that includes an integrated circuit, that is arranged on a chassis and/or in an enclosure, and that uses a fan for cooling. One or more integrated circuits 708 may be arranged on the motherboard 704.

For example only, the integrated circuit 708 may include a central processing unit (CPU), an application specific integrated circuit (ASIC), a graphics processing unit (GPU) and/or other type of integrated circuit. A heatsink 712 communicates thermally with the integrated circuit 708 and absorbs heat therefrom. A fan 716 circulates air over the heatsink 712 to dissipate heat.

One or more other types of integrated circuits such as a graphics processing unit (GPU) 718 may be arranged on the motherboard 704. A heatsink 722 communicates thermally with the GPU 718 and transfers heat therefrom. A fan 726 circulates air over the heatsink 722 to dissipate heat. The motherboard 704 may be arranged on a chassis and/or in an enclosure 730. One or more additional fans 734 may provide additional cooling inside of the enclosure. Other components 744 such as memory modules and/or other modules or devices (not shown) may be arranged on the motherboard 704.

In operation, the integrated circuit 708 may include an audio monitoring module 750 that monitors audio signals generated by the fans 716, 726 and/or 734. A microphone 754 may be arranged inside of the enclosure 730. Alternately, a microphone 756 may be arranged outside of the enclosure 730. Alternately, a speaker 758 may be used as a microphone. Sound waves impacting the speaker 756 may be sensed and used for analysis.

The integrated circuit 708 and/or the GPU 718 may include the audio monitoring (AM) module 750 that performs audio analysis on the audio signals as described above. Alternately, the AM module 750 may be a stand alone device or integrated with any other component or integrated circuit. The AM module 750 may perform sub-band analysis. Operation of the fans can be improved by monitoring signal levels, frequencies and noise patterns as well as the changes of monitored parameters as a function of time.

Fan operating parameters may be automatically adjusted to lower acoustic noise. By doing so, user annoyance may be decreased. Operation of the fan away from resonance modes can be performed. In addition, real time monitoring of fan noise may be used to predict future failure events. Analysis of historical data may be performed to estimate and monitor aging of the fan.

The audio monitoring may also be used as a relatively low cost method for differentiating product quality. For example, this approach can be used to separate high quality or low quality fans from other medium-quality fans. Lower noise devices tend to be more reliable than the higher noise ones, particularly for fans having the same or similar designs. In addition, real time monitoring of mechanical components can be used to improve future quality levels.

While HDD and DVD systems are disclosed, the present disclosure applies to other rotating storage devices, magnetic storage devices and/or optical storage devices.

In addition to or instead of altering an operating parameter of the component as described above, the audio monitoring module may generate signals to provide an indication as to how the component is operating. For example only, when the component is making more noise that is typically acceptable, the audio monitoring module may generate an indication signal to a host device. For example only, when the fan is making too much noise, the CPU may send an error message to the operating system (OS) to notify the OS and/or the user.

The audio monitoring module may provide a list of actions that can be taken by the user. For example, the audio monitoring module may allow the user to select from a plurality of different options. Some of the options may include operating in restricted modes such as low power modes, limited processing modes, etc. For implementations with fans, the user may select a safe shutdown mode when the temperature of the device reaches a predetermined temperature value.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A control system for a rotating data storage device, the control system comprising:
  a drive module configured that to at least one of (i) process data, (ii) store data, and (iii) control operation of the rotating storage device; and
  an audio monitoring module configured to (i) communicate with the drive module and (ii) analyze audio signals that are based on noise generated by the rotating storage device during operation,
  wherein the rotating storage includes a first component, and wherein the audio monitoring module is configured to selectively adjust a rotational speed of the first component by (i) a predeterimined value or (ii) a predetermined percentage of the rotational speed in response to detecting resonance of the first component,
  wherein the drive module is integrated with the audio monitoring module in an integrated circuit (IC), and
  wherein the IC is arranged on a printed board (PCB) of the rotating storage device.

2. The control system of claim 1, wherein the drive module comprises one of a magnetic storage control module and an optical storage control module.

3. The control system of claim 1, wherein the drive module comprises a read/write channel module.

4. The control system of claim 1, wherein the drive module comprises a processor.

5. The control system of claim 1, wherein the drive module comprises a spindle/voice coil motor drive module or a spindle/-feed motor module.

6. A data storage device comprising;
the control system of claim 1; and
the rotating storage device.

7. The data storage device of claim 6, further comprising a microphone configured to generate the audio signals.

8. The data storage device of claim 6, wherein the audio monitoring module is configured to selectively adjust an operating parameter of the first component based on the audio signals.

9. The data storage device of claim 6 wherein the first component is configured to (i) rotate a rotating storage medium or (ii) read data from the rotating storage medium.

10. The data storage device of claim 6, wherein the rotating storage device includes a magnetic storage device or an optical storage device.

11. The data storage device of claim 6, wherein the audio monitoring module is configured to selectively diagnose failures of the first component based on the audio signals.

12. The data storage device of claim 6, wherein the audio monitoring module is configured to selectively estimate an age of the first component based on the audio signals.

13. The data storage device of claim 6, wherein the audio monitoring module is configured to selectively predict future component failure of the first component based on the audio signals.

14. The data storage device of claim 6, wherein the audio monitoring module is configured to selectively estimate product quality of the data storage device based on the audio signals.

15. The data storage device of claim 6, wherein the audio monitoring module is configured to selectively correlate the audio signals with a stored failure profile to predict failure of the first component.

16. The data storage device of claim 6, further comprising an analog to digital converter configured to convert the audio signals to digital audio signals.

17. The data storage device of claim 7, wherein the data storage device comprises a hard disk drive including a hard disk drive assembly (HDDA), and wherein the microphone is arranged on the HDDA or the PCB.

18. The data storage device of claim 17, wherein the hard disk drive includes:
the drive module;
a processor;
a spindle/voice coil motor (VCM) driver module; and
a read/write channel module.

19. The data storage device of claim 18, wherein at least one of (i) the processor, (ii) the spindle/VCM driver module, and (iii) the read/write channel module is integrated in the IC.

20. The data storage device of claim 7, wherein the data storage device comprises a digital versatile disc (DVD) drive including a digital versatile disk assembly (DVDA), and wherein the microphone is arranged on the DVDA or the PCB.

21. The data storage device of claim 20, wherein the DVD drive includes:
the drive module;
a processor;
a spindle/feed motor (FM) driver module; and
a read/write channel module.

22. The data storage device of claim 21, wherein at least one of (i) the processor, (ii) the spindle/FM driver module, and (iii) the read/write channel module is integrated in the IC.

23. The data storage device of claim 1, wherein the audio monitoring module is configured to perform sub-band analysis of the audio signals.

24. The data storage device of claim 1, wherein the first component includes at least one of (i) a spindle motor and (ii) a voice coil motor (VCM).

25. The data storage device of claim 1, wherein the first component includes at least one of (i) a spindle motor and (ii) a feed motor.

26. The data storage device of claim 17, further comprising;
a flex connector configured to connect components of the HDDA and the PCB,
wherein the microphone is arranged on the HDDA, and
wherein a conductor configured to communicate with (i) the audio monitoring module and (ii) the microphone is associated with the flex connector.

27. The data storage device of claim 20, further comprising:
a flex connector configured to connect components of the DVDA and the PCB,
wherein the microphone is arranged on the DVDA, and
wherein a conductor configured to communicate with (i) the audio monitoring module and (ii) the microphone is associated with the flex connector.

28. The data storage device of claim 19, wherein the hard disk drive includes a power management interface module integrated in the IC.

29. The data storage device of claim 22 wherein the DVD drive includes a power management interface module integrated in the IC.

30. A method for operating a rotating data storage device, the method comprising:
performing at least one of (i) processing data, (ii) storing data and (iii) controlling operation of the rotating storage device using a drive module;
analyzing, using an audio monitoring module, audio signals that are based on noise generated by the rotating storage device during operation;
detecting resonance of a first component of the rotating storage device; and
in response to detecting the resonance, selectively adjusting a rotational speed of the first component by (i) a predetermined value or (ii) a predetermined percentage of the rotational speed,
wherein the drive module is integrated with the audio monitoring module in an integrated circuit (IC), and
wherein the IC is arranged on a drive printed circuit board (PCB) of the rotating storage device.

31. The method of claim 30, wherein the drive module comprises one of a magnetic storage control module, an optical storage control module, a read/write channel module, a processor, a spindle/voice coil motor drive module, and a spindle/feed motor module.

32. The method of claim 30, further comprising:
adjusting operation of the first component based on an input operating parameter; and
selectively adjusting the input operating parameter of the first component based on the audio signals.

33. The method of claim 30, wherein the rotating storage device includes a magnetic storage device or an optical storage device.

34. The method of claim 30, further comprising selectively diagnosing failures of the first component based on the audio signals.

35. The method of claim 30, further comprising selectively estimating an age of the first component based on the audio signals.

36. The method of claim 30, further comprising selectively predicting future component failure of the first component based on the audio signals.

37. The method of claim 30, further comprising selectively estimating product quality of the data storage device based on the audio signals.

38. The method of claim 30, further comprising selectively correlating the audio signals with a stored failure profile to predict failure of the first component.

39. The method of claim 30, further comprising performing sub-band analysis of the audio signals.

40. The method of claim 30, wherein the first component includes at least one of (i) a spindle motor and (ii) a voice coil motor (VCM).

41. The method of claim 30, wherein the first component includes at least one of (i) a spindle motor and (ii) a feed motor.

42. The control system of claim 1, wherein the audio monitoring module selectively generates an indication signal based on the audio signals.

43. The method of claim 30, further comprising selectively generating an indication signal based on the audio signals.

\* \* \* \* \*